(12) United States Patent
Park et al.

(10) Patent No.: US 11,589,416 B2
(45) Date of Patent: Feb. 21, 2023

(54) METHOD AND DEVICE FOR REDUCING POWER CONSUMPTION BY TERMINAL IN WIRELESS COMMUNICATION SYSTEM

(71) Applicant: SAMSUNG ELECTRONICS CO., LTD., Suwon-si (KR)

(72) Inventors: Suyoung Park, Suwon-si (KR); Suha Yoon, Suwon-si (KR); Euichang Jung, Suwon-si (KR); Hongju Park, Suwon-si (KR); Sunghyuk Shin, Suwon-si (KR); Soomin Lee, Suwon-si (KR); Jangbok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/057,213

(22) PCT Filed: May 16, 2019

(86) PCT No.: PCT/KR2019/005866
§ 371 (c)(1),
(2) Date: Nov. 20, 2020

(87) PCT Pub. No.: WO2019/225900
PCT Pub. Date: Nov. 28, 2019

(65) Prior Publication Data
US 2021/0227623 A1    Jul. 22, 2021

(30) Foreign Application Priority Data

May 24, 2018    (KR) .......................... 10-2018-0059233

(51) Int. Cl.
*H04W 76/30*    (2018.01)
*H04W 76/15*    (2018.01)
(Continued)

(52) U.S. Cl.
CPC ....... *H04W 76/30* (2018.02); *H04W 72/1273* (2013.01); *H04W 76/15* (2018.02); *H04W 76/27* (2018.02); *H04W 76/28* (2018.02)

(58) Field of Classification Search
None
See application file for complete search history.

(56) References Cited

U.S. PATENT DOCUMENTS

| 8,995,394 | B2 | 3/2015 | Edara et al. |
| 9,467,941 | B2 | 10/2016 | Tsai et al. |

(Continued)

FOREIGN PATENT DOCUMENTS

| CN | 105103605 A | * 11/2015 | ......... H04L 12/1407 |
| KR | 10-2016-0141002 | 12/2016 | |

(Continued)

OTHER PUBLICATIONS

3GPP UMTS Radio Resource Control (RRC) Protocol Specification, 25.331 vers. 10.4.0 Rel.10 (Year: 2011).*

(Continued)

*Primary Examiner* — Jamaal Henson
(74) *Attorney, Agent, or Firm* — Nixon & Vanderhye P.C.

(57) ABSTRACT

The present disclosure relates to a 5G or pre-5G communication system for supporting higher data transmission rate beyond a 4G communication systems such as LTE. A method by a terminal in a wireless communication system according to an embodiment of the present invention comprises the steps of: deciding the release of the connection to a secondary node; generating a connection release request message for requesting the connection release; and transmitting the connection release request message.

14 Claims, 27 Drawing Sheets

(51) Int. Cl.
*H04W 76/28* (2018.01)
*H04W 76/27* (2018.01)
*H04W 72/1273* (2023.01)

(56) References Cited

U.S. PATENT DOCUMENTS

| | | | | |
|---|---|---|---|---|
| 2002/0112054 | A1* | 8/2002 | Hatanaka | H04L 9/40 709/225 |
| 2007/0135080 | A1* | 6/2007 | Islam | H04W 52/0251 455/343.1 |
| 2009/0042560 | A1* | 2/2009 | Islam | H04W 76/38 455/423 |
| 2013/0017819 | A1* | 1/2013 | Wang | H04W 8/22 455/418 |
| 2013/0336285 | A1* | 12/2013 | Edara | H04W 36/16 370/331 |
| 2015/0092554 | A1* | 4/2015 | Mochizuki | H04W 76/27 370/252 |
| 2015/0146599 | A1* | 5/2015 | Jha | H04B 7/2621 455/566 |
| 2015/0223178 | A1* | 8/2015 | Pietraski | H04W 52/325 370/252 |
| 2015/0282080 | A1* | 10/2015 | Maattanen | H04W 76/28 370/311 |
| 2015/0334767 | A1* | 11/2015 | Chien | H04W 24/08 370/217 |
| 2015/0341786 | A1 | 11/2015 | Wang et al. | |
| 2016/0029361 | A1* | 1/2016 | Lu | H04W 72/0406 370/329 |
| 2016/0112921 | A1* | 4/2016 | Nagasaka | H04W 28/08 370/331 |
| 2016/0192433 | A1* | 6/2016 | Deenoo | H04W 24/08 370/329 |
| 2016/0227396 | A1* | 8/2016 | Lee | H04W 76/30 |
| 2017/0055187 | A1 | 2/2017 | Kang et al. | |
| 2017/0055242 | A1* | 2/2017 | Kusashima | H04L 27/2607 |
| 2017/0064769 | A1* | 3/2017 | Zhang | H04W 76/27 |
| 2017/0086254 | A1* | 3/2017 | Lee | H04W 72/0413 |
| 2017/0127473 | A1* | 5/2017 | Virtej | H04W 76/38 |
| 2021/0167930 | A1* | 6/2021 | Jeon | H04B 17/318 |

FOREIGN PATENT DOCUMENTS

| | | | | |
|---|---|---|---|---|
| WO | WO-2012149321 A1 * | 11/2012 | | H04W 52/0219 |
| WO | WO-2014085980 A1 * | 6/2014 | | H04W 52/0222 |
| WO | 2014/104853 | 7/2014 | | |
| WO | WO-2015197904 A1 * | 12/2015 | | H04L 5/0032 |
| WO | 2017052206 | 3/2017 | | |
| WO | WO-2017034230 A1 * | 3/2017 | | H04W 24/02 |

OTHER PUBLICATIONS

LG Electronics Inc: Summary of E-mail discussion on [99bis#43] [NR UP/MAC] Impact of BWP, R2-1713879, 3GPP TSG-RAN WG2 Meeting #100, Reno, USA; Nov. 27, 2017-Dec. 1, 2017, pp. 1-35.

Huawei et al: "Discussion on BWP inactivity timer", R2-1800189, 3GPP TSG-RAN2#AH-1801, Vancouver, Canada; Jan. 22, 2018-Jan. 26, 2018, 5 pages.

Extended Search Report dated Apr. 14, 2021 in European Patent Application No. 19806692.0.

International Search Report for PCT/KR2019/005866, dated Aug. 22, 2019, 4 pages.

Written Opinion of the ISA for PCT/KR2019/005866, dated Aug. 22, 2019, 6 pages.

ZTE Corporation, "Handling on SN measurement results upon SCG failure", 3GPP Draft; R2-1710331 Handling on SN measurement results upon SCG failure, Sep. 29, 2017 3rd Generation Partnership Project (3GPP), Sep. 29, 2017, 9 pages.

Office Action for KR Application No. 10-2018-0059233 dated Oct. 19, 2022 and English translation, 17 pages.

* cited by examiner

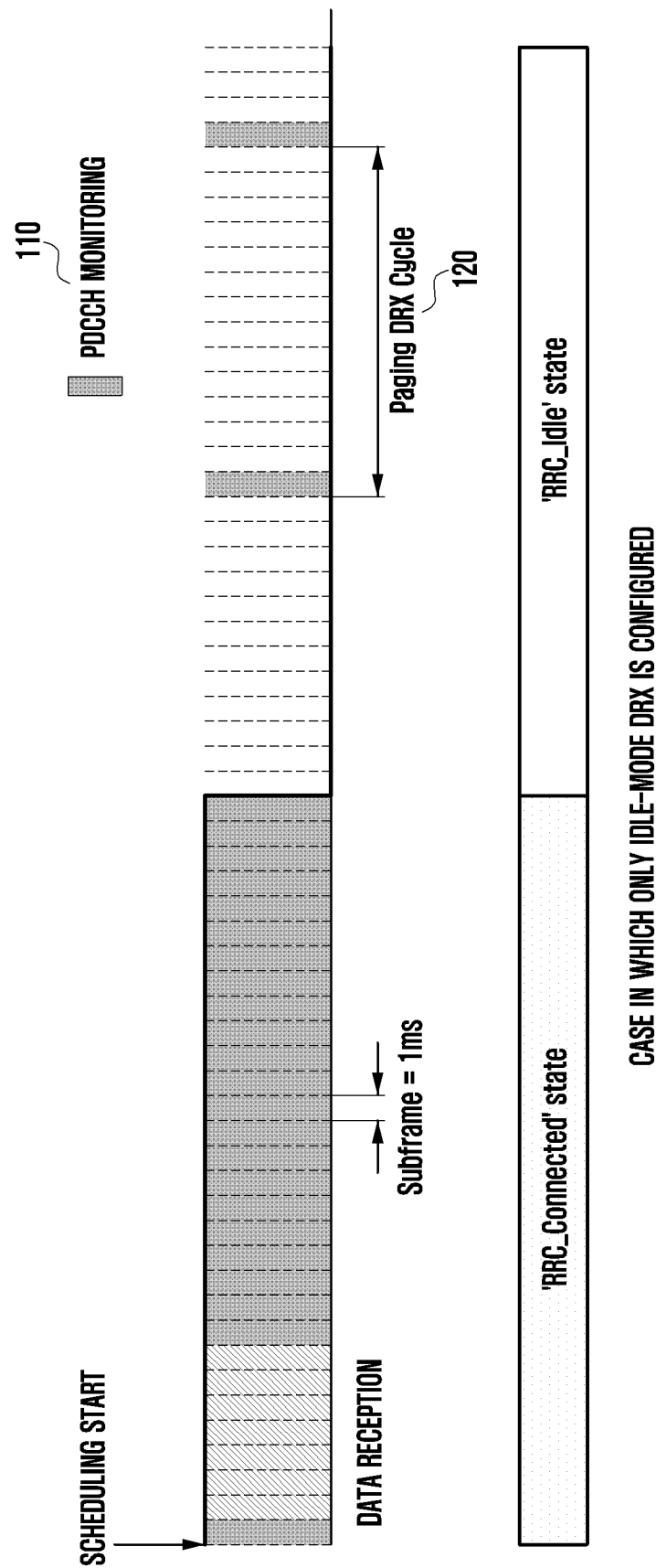

METHOD AND DEVICE FOR REDUCING POWER CONSUMPTION BY TERMINAL IN WIRELESS COMMUNICATION SYSTEM

This application is the U.S. national phase of International Application No. PCT/KR2019/005866 filed 16 May 2019, which designated the U.S. and claims priority to KR Patent Application No. 10-2018-0059233 filed 24 May 2018, the entire contents of each of which are hereby incorporated by reference.

TECHNICAL FIELD

The disclosure relates to a wireless communication system, and more particularly to a method and device for reducing power consumption by a terminal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, the 3GPP standard defines methods for providing a high-speed service to one terminal using a plurality of carriers. Carrier aggregation may be used when two cells are connected by ideal backhaul. Another approach is to use dual connectivity (DC) when non-ideal backhaul connects two cells. In addition, as the standard for the 5G communication system is defined, in addition to the existing CA or DC system of the LTE-LTE combination, there may be CA or DC systems configured by the LTE-NR combination or NR-NR combination. In particular, in the early stage of the 5G communication system, a DC system (EN-DC), in which an LTE cell is a master node and an NR cell is a secondary node, is considered first. When the terminal is in a DC state, the terminal consumes unnecessary current in the state in which a secondary cell (SCell) is activated, and there is a need for a method for solving this.

DESCRIPTION OF INVENTION

Technical Problem

The disclosure has been proposed to solve the above problems, and an objective of the disclosure is to propose a method and apparatus for reducing power consumption by a terminal which is in a dual-connectivity state.

Solution to Problem

In order to solve the problem described above, the disclosure provides a method by a terminal in a wireless communication system, the method including: determining a connection release from the secondary node; generating a connection release request message for requesting the connection release; and transmitting the connection release request message.

Further, in order to solve the problem described above, the disclosure provides a method by a base station in a wireless communication system, the method including: transmitting configuration information including timer information to a terminal concurrently connected to a master node and a secondary node; transmitting scheduling information to the terminal; receiving a connection release request message for requesting release of a connection with the secondary node according to a time point at which the timer information and the scheduling information are transmitted; and releasing a connection between the terminal and the secondary node.

Furthermore, in order to solve the problem described above, the disclosure provides a terminal in a wireless communication system, the terminal including: a transceiver; and a controller configured to: determine a connection release from the secondary node; generate a connection release request message for requesting the connection release; and transmit the connection release request message.

Additionally, in order to solve the problem described above, the disclosure provides a base station in a wireless communication system, the base station including: a transceiver; and a controller configured to: transmit configuration information including timer information to a terminal concurrently connected to a master node and a secondary node; transmit scheduling information to the terminal; receive a connection release request message for requesting release of a connection with the secondary node according to a time point at which the timer information and the scheduling information are transmitted; and release a connection between the terminal and the secondary node.

Advantageous Effects of Invention

According to an embodiment of the disclosure, there is an effect of reducing power consumption by a terminal which is in a dual-connectivity state.

BRIEF DESCRIPTION OF DRAWINGS

FIGS. 1A and 1B illustrate a DRX operation.

MODE FOR THE INVENTION

Figure 1B:
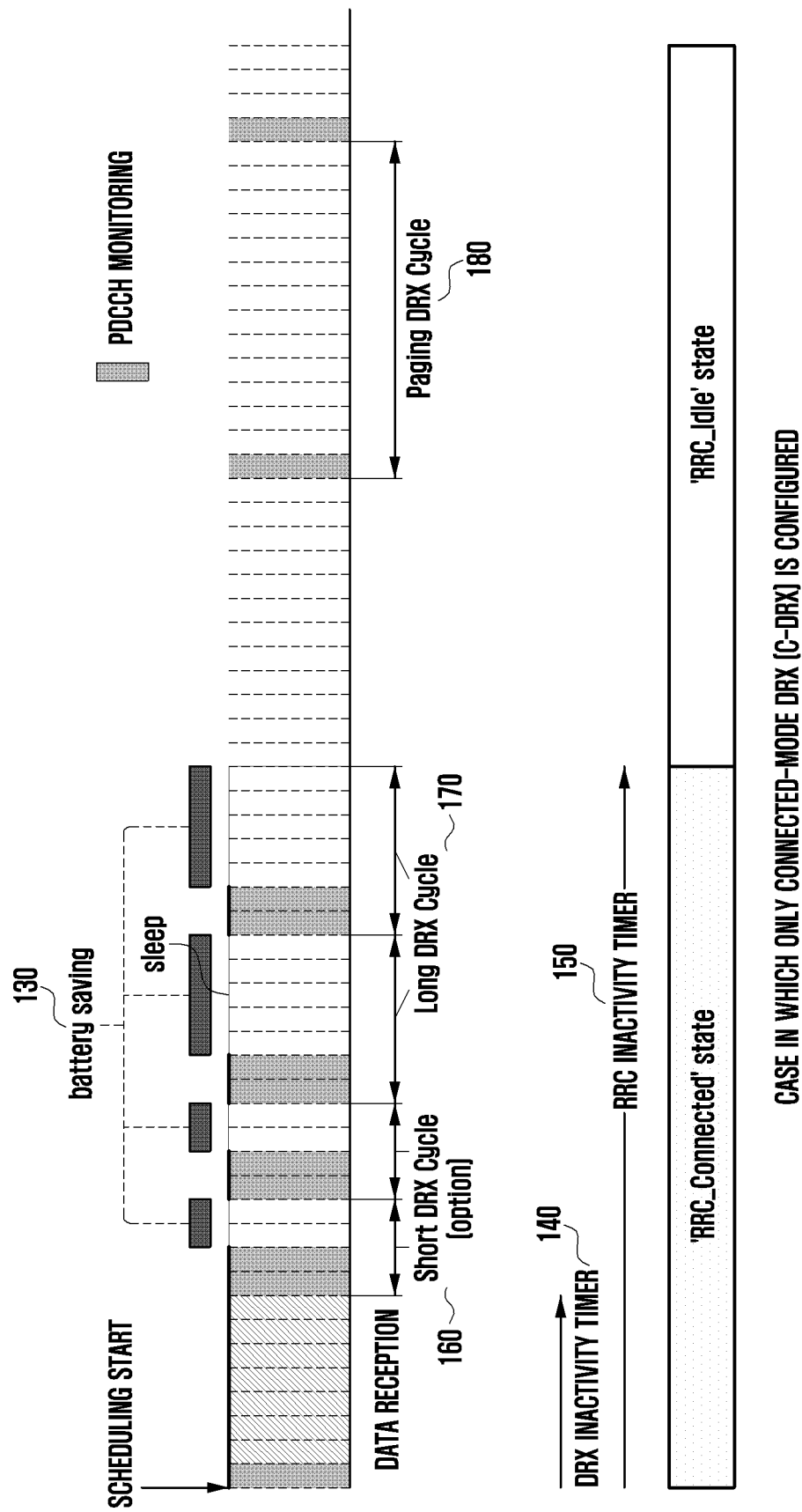

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In long-term evolution (LTE), a terminal may operate in RRC_CONNECTED and RRC_IDLE states. In the case of new radio (NR), an RRC_INACTIVE state was added in addition to the two states. State transitions therebetween are in charge of the RRC of each RAT. In addition, in the DC system, state transition occurs only in the RRC of the master node.

A 10 ms radio frame unit is used for transmission between a base station and a terminal. One radio frame includes 10 subframes of 1 ms. Control information relating to data to be received by the terminal may be transmitted through a physical downlink control channel (PDCCH) included in every subframe.

In order to know whether there is data to be received, the terminal needs to monitor the PDCCH every subframe. Since the terminal does not always receive data every subframe, monitoring the PDCCH every subframe consumes a lot of battery power.

DRX is an operation for reducing battery consumption. If there is no traffic, the terminal enters a sleep mode (RF transceiver off) for a predetermined period of time and wakes up, and if there is traffic, the terminal enters an active mode (RF transceiver on) and transmits or receives data. The network transmits configuration information for determining when and for how long the terminal sleeps and wakes up to the terminal through a higher-layer control message or a system information block type 2 (SIB2) message broadcasted by the base station.

DRX may be used in both an idle state (RRC_IDLE state) and a connected state (RRC_CONNECTED state). DRX applied in the idle state is called Idle-mode DRX and DRX applied in the connected state is called Connected-mode DRX (C-DRX). Idle-mode DRX may operate in conjunction with a paging monitoring cycle.

Here, the RRC_Idle state may denote a state in which a radio connection (RRC connection) is not established between a base station and a terminal, and the RRC_Connected state may denote a state in which a radio connection (RRC connection) is established between the base station and the terminal. A detailed DRX operation is described in FIG. 1.

FIGS. 1A and 1B illustrate a DRX operation.

When only Idle-mode DRX is configured, as shown in FIG. 1A, a terminal monitors the PDCCH in every subframe regardless of whether data is received in the connected state (indicated by reference numeral 110). On the other hand, if C-DRX is configured as shown in FIG. 1B, the terminal reduces battery consumption by turning off a RF transceiver if there is no data actually transmitted or received even in the connected state (indicated by reference numeral 130). Therefore, battery consumption can be reduced during an inactive time when the terminal enters the sleep mode.

Specifically, the Idle-mode DRX will be described with reference to FIG. 1A. Referring to FIG. 1A, when traffic destined for a terminal in an RRC_Idle state (hereinafter, referred to as an idle state) occurs, paging occurs in the corresponding terminal. The terminal periodically wakes up, i.e., every paging DRX cycle 120, to monitor the PDCCH. If paging occurs, the terminal transitions to the connected state and receives data. If not, the terminal enters the sleep mode again. Although not shown in FIG. 1A, a DRX cycle having a long period may exist even in the RRC_Idle state.

If paging is not received a predetermined number of times, the terminal may operate in a DRX cycle having a long period. Here, the length of a DRX cycle having long period may be an integer multiple of that of a short DRX cycle.

The terminal obtains Idle-mode DRX configuration information from a higher-layer control message or an SIB2 message broadcasted by a base station. The terminal calculates a subframe for monitoring the PDCCH. The terminal in an idle state monitors only one subframe (PO) per paging DRX cycle.

The connected-mode DRX will be described with reference to FIG. 1B.

When the terminal receives scheduling information (e.g., DL grant) in an RRC_Connected state (hereinafter, "connected state"), a DRX inactivity timer 140 and an RRC inactivity timer 150 are started.

When the DRX inactivity timer 140 expires, a DRX mode is started, and the terminal wakes up every DRX cycle and monitors the PDCCH for a predetermined duration (on-duration timer).

There are two types of DRX cycles: a short DRX cycle 160 and a long DRX cycle 170. The short DRX cycle may be optionally configured. If short DRX is configured, the terminal starts with a short DRX cycle 160 and then transitions to a long DRX cycle 170 when the DRX mode is started. The length of the long DRX cycle may be configured as a multiple of that of the short DRX cycle, and the terminal wakes up more frequently in the short DRX cycle.

When the RRC inactivity timer 150 expires, the terminal transitions to the idle state and a paging DRX cycle starts.

Meanwhile, in a 5G system, an RRC_Inactive state has been introduced in addition to the RRC_Idle and RRC_Connected states. In RRC_Inactive, a core network recognizes that the terminal is in a connected state and transmits a paging message to at least one base station with which the terminal is registered. In addition, at least one base station, having received the paging message, generates a message related to the paging and transmits the message to the RAN-based area.

In order to switch the terminal from the RRC_Inactive state to the RRC_Connected state, the base station transmits a resume message, and the resume message may include information related to a UE AS context, for example, a UE AS context ID. In the RRC_Inactive state, both the base station and the terminal may store UE AS context information.

Meanwhile, NR considers interworking with LTE. The most representative LTE/NR interworking is multi-RAT dual connectivity (MR-DC). MR-DC may be classified into the case in which LTE is a master node (MN) and the case in which NR is a MN. In addition, a different network configuration is possible depending on the type of the core network. This is summarized in <Table 1> below.

TABLE 1

| MN Core | EPC | 5GC |
|---|---|---|
| eNB | EN-DC(option 3) | NGEN-DC(option 7) |
| NR | X | NE-DC(option 4) |

Figure 2A:
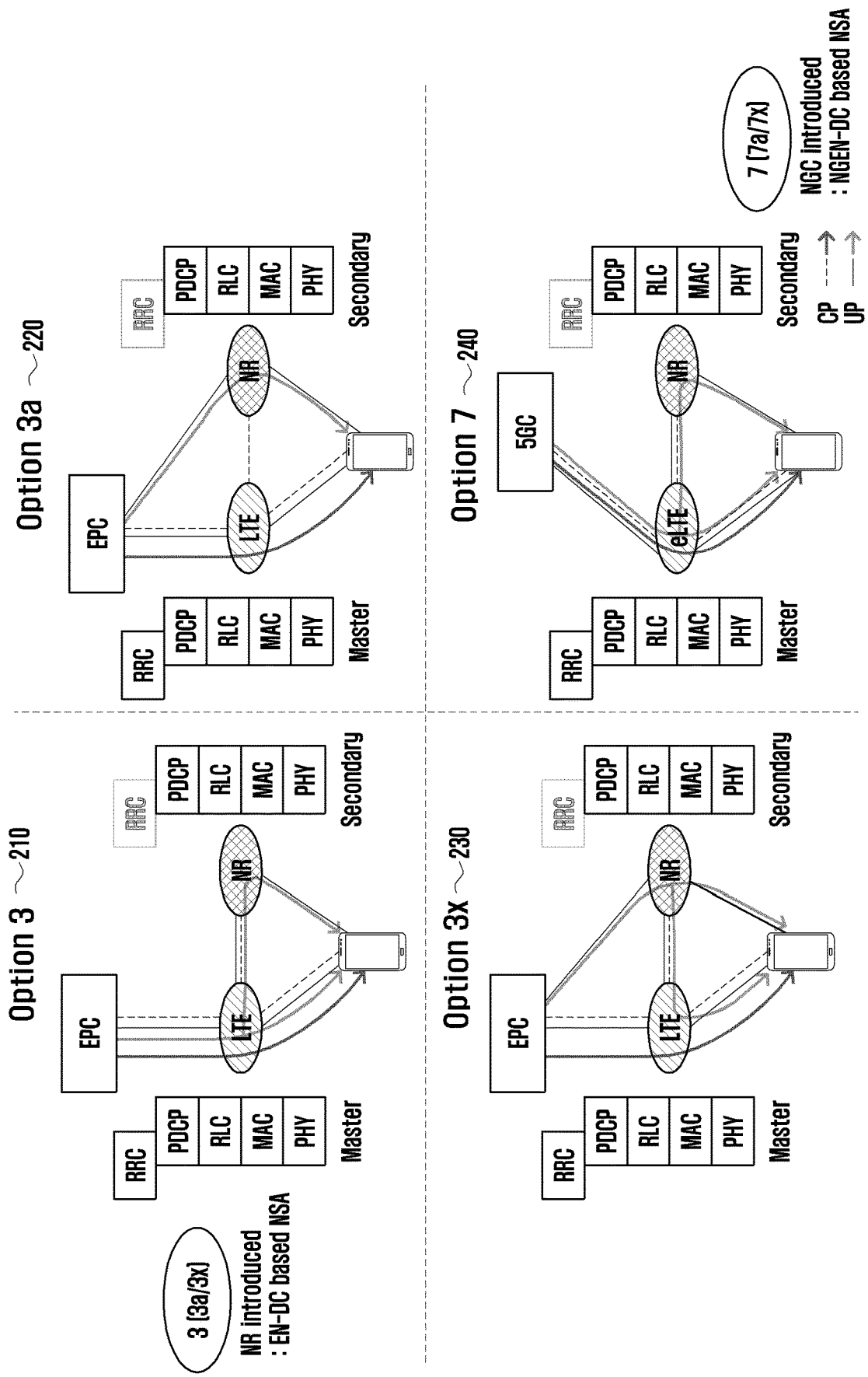
FIGS. 2A and 2B illustrate the configuration of multi-RAT dual connectivity according to the disclosure.
Figure 2B:
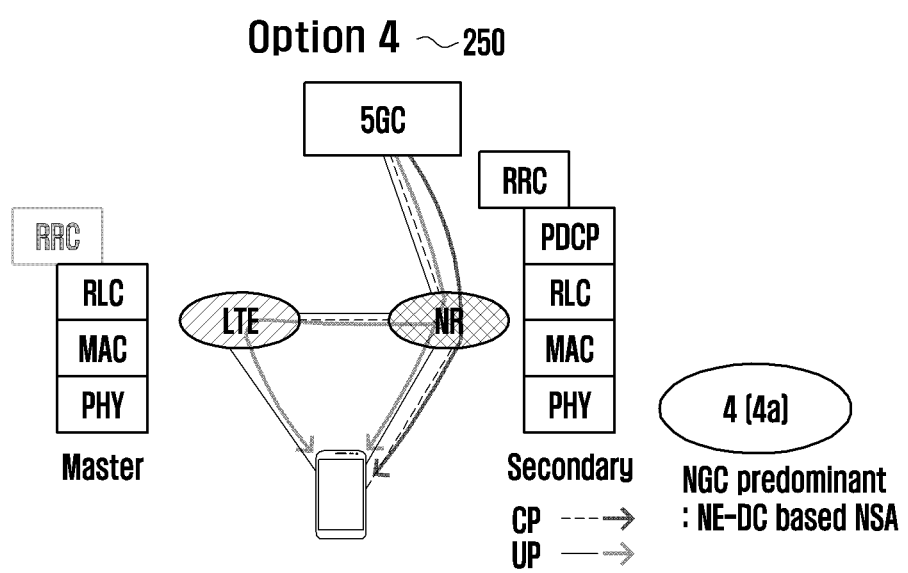

The configuration of the system is shown in FIGS. 2A and 2B.

FIGS. 2A and 2B illustrate the configuration of a multi-RAT dual connectivity according to the disclosure.

However, in the disclosure, the frequency aggregation technique will be described before describing the configuration of dual connectivity between multiple networks.

Figure 2C:
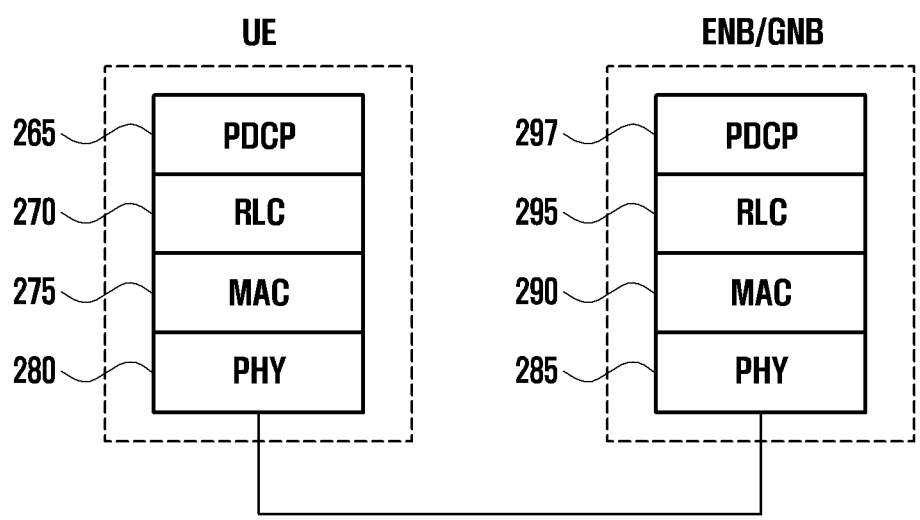
FIG. 2C illustrates a radio protocol structure in LTE and 5G systems according to an embodiment of the disclosure.

FIG. 2C illustrates a radio protocol structure in LTE and 5G systems according to an embodiment of the disclosure.

Referring to FIG. 2C, a wireless protocol in an LTE or 5G system includes packet data convergence protocols (hereinafter, PDCPs) 265 and 297, radio link controls (hereinafter, RLCs) 270 and 295, medium access controls (MACs) 275 and 290, and physical layers (PHYs) 280 and 285 in a terminal (eNB) and a base station (gNB), respectively.

Next, with reference to FIG. 3A, intra-base station frequency aggregation technology (for example, CA or DC) in an LTE system according to an embodiment of the disclosure will be described.

Figure 3A:
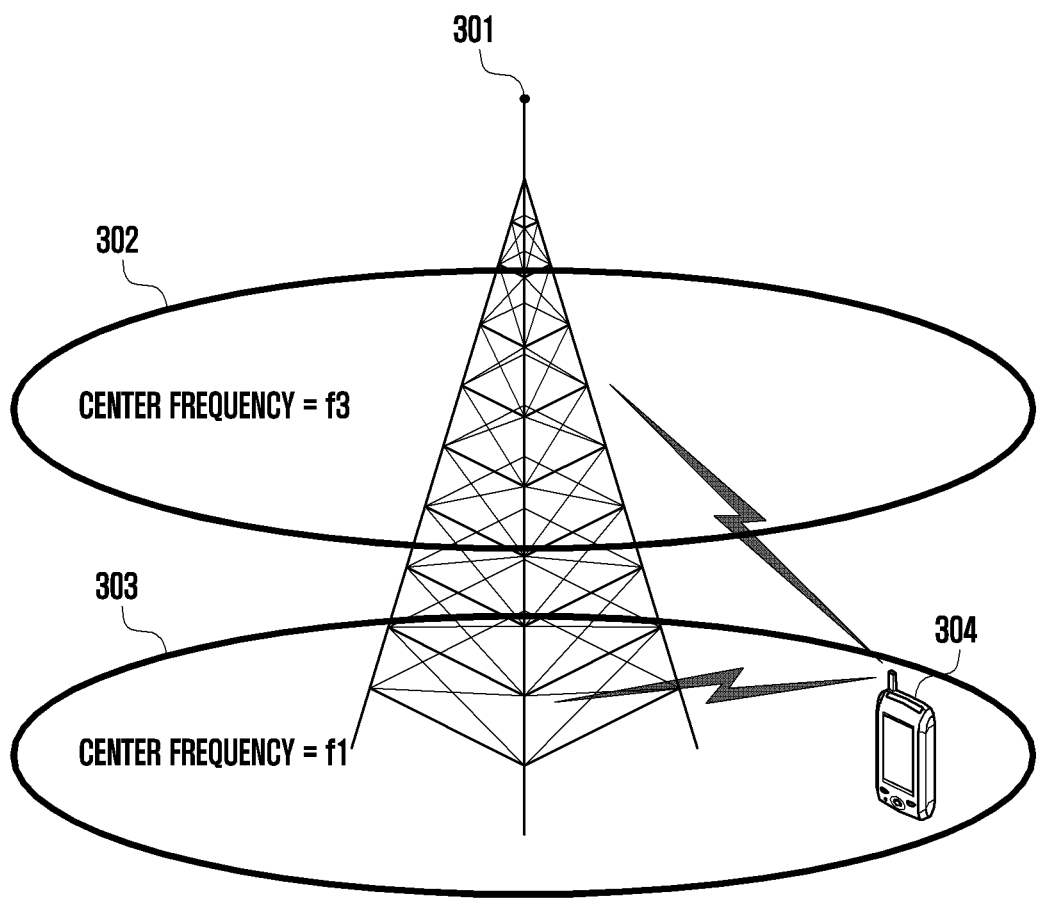
FIG. 3A schematically illustrates an intra-base station frequency aggregation technology in an LTE/5G system according to an embodiment of the disclosure.

FIG. 3A schematically illustrates an intra-base station frequency aggregation technology in an LTE/5G system according to an embodiment of the disclosure.

Referring to FIG. 3A, one base station may generally transmit or receive signals through multiple carriers over several frequency bands. For example, when data is transmitted from a base station 301 through a carrier 303 having a forward center frequency of f1 and a carrier 302 having a forward center frequency of f3, one terminal conventionally transmits or receives data by using one of the two carriers.

However, a terminal having frequency aggregation technology capability may concurrently transmit or receive data through multiple carriers. The base station 301 may increase the transmission rate of data for the terminal 304 by allocating more carriers according to the situation to the terminal 304 having the frequency aggregation technology capability.

As described above, the aggregation of downlink carriers or aggregation of uplink carriers, through which one base station transmits or receives signals, is referred to as "intra-eNB CA".

However, depending on the case, unlike what is shown in FIG. 3A, aggregation of downlink carriers or aggregation of uplink carriers of different base stations may be required.

In FIG. 3A, the intra-base station carrier aggregation operation in the LTE/5G system according to an embodiment of the disclosure has been described. Next, inter-base station carrier aggregation technology in the LTE/5G system according to an embodiment of the disclosure will be described with reference to FIG. 3B.

Figure 3B:
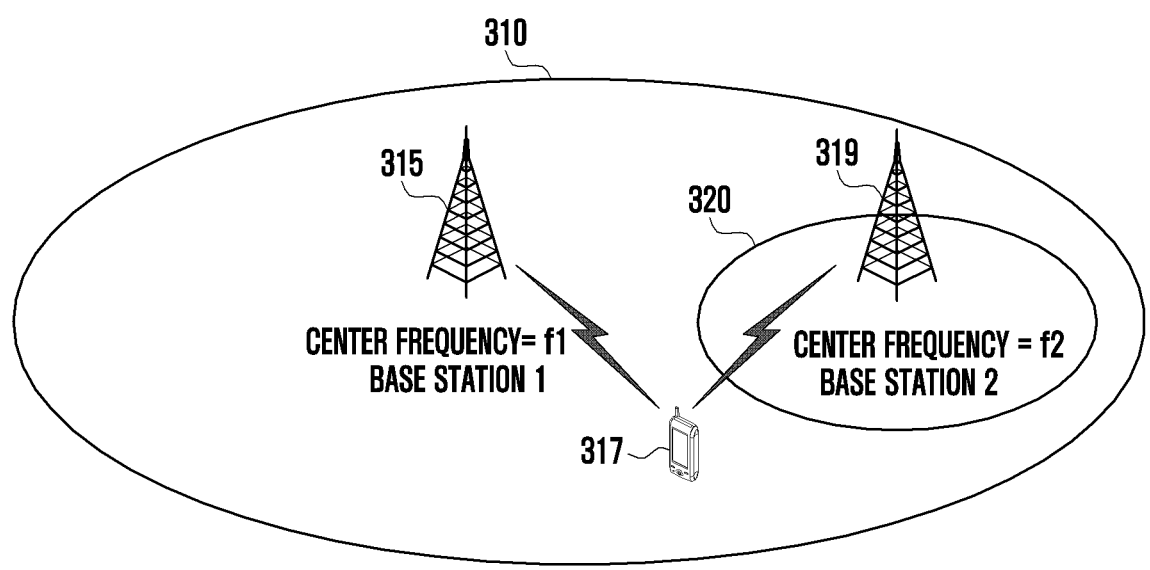
FIG. 3B schematically illustrates an inter-base station carrier aggregation operation according to an embodiment of the disclosure.

FIG. 3B schematically illustrates an inter-base station carrier aggregation operation according to an embodiment of the disclosure.

Referring to FIG. 3B, when base station 1 315 transmits or receives a signal through a carrier having a center frequency of f1 and base station 2 319 transmits or receives a signal through a carrier having a center frequency of f2, if a terminal 317 aggregates (combines) a carrier having a forward center frequency of f1 and a carrier having a forward center frequency of f2, then aggregation of carriers of two or more base stations by one terminal results. In an embodiment of the disclosure, this is referred to as "inter-ENB/GNB carrier aggregation (or inter-base station CA)".

In one embodiment of the disclosure, inter-base station carrier aggregation is referred to as dual connectivity or multiple connectivity (hereinafter referred to as "DC").

For example, establishment of multiple connectivity or dual connectivity (DC) denotes that inter-base station carrier aggregation has been established, that one or more cell groups have been established, that a secondary cell group (SCG) has been established, that at least one secondary cell controlled by a base station rather than a serving base station has been established, that a primary SCell (PSCell) has been established, that a MAC entity for a secondary base station (secondary eNB, hereinafter referred to as "SeNB", or secondary gNB, hereinafter referred to as "SgNB") has been established, that two MAC entities have been established for a terminal, and the like.

Meanwhile, terms that will be frequently used in describing embodiments of the disclosure will be briefly described as follows.

In the conventional sense, when one downlink carrier and one uplink carrier of one base station configure one cell, carrier aggregation may be understood as a terminal concurrently transmitting or receiving data through multiple cells. Here, the maximum transmission rate and the number of aggregated carriers have a positive correlation.

In the following embodiments of the disclosure, the feature whereby the terminal receives data through an arbitrary downlink carrier or transmits data through an arbitrary uplink carrier has the same meaning as the feature of transmitting or receiving data using a control channel and a data channel provided by a cell corresponding to a frequency band and a center frequency that characterize the carrier. In embodiments of the disclosure, in particular, carrier aggregation will be expressed as "a plurality of serving cells are configured", and terms such as "primary serving cell" (hereinafter referred to as PCell), a secondary serving cell (hereinafter referred to as an SCell), or "an activated serving cell" will be used. The terms have the same meanings as those used in the context of the LTE mobile communication system. In the embodiments of the disclosure, it should be noted that terms such as "carrier", "component carrier", "serving cell", and the like are interchangeably used.

In the embodiments of the disclosure, a set of serving cells controlled by the same base station or a base station that is synchronized is defined as a cell group or a carrier group (hereinafter referred to as a "CG"). The cell group is further divided into a master cell group (hereinafter referred to as an "MCG") and a secondary cell group (SCG).

The MCG denotes a set of serving cells controlled by a base station controlling a PCell (hereinafter, referred to as a master base station, MeNB, or MgNB), and the SCG denotes a set of serving cells, controlled by a base station other than the base station that controls the PCells, that is, a base station that controls only the SCells (hereinafter, a slave base station, SeNB, or SgNB). The base station notifies the terminal whether a specific serving cell belongs to the MCG or the SCG in the process of configuring the corresponding serving cell.

One MCG and one or more SCGs may be configured in one terminal. In the embodiments of the disclosure, only the case where one SCG is configured is considered for convenience of explanation. However, even if one or more SCGs are configured, the contents of the disclosure can be applied without any additional modification. "PCell" and "SCell" are terms indicating the type of serving cell configured in the terminal. There are some differences between the PCell and the SCell. For example, the PCell always remains in an active state, but in the case of the SCell, an active state and an inactive state are selectively operated according to an indication from the base station. The mobility of the terminal is controlled around the PCell, and the SCell may be understood as an additional serving cell for data transmission or reception. The PCell and SCell in the embodiments of the disclosure may be the PCell and SCell defined in the LTE standard 36.331 or 36.321. Alternatively, the PCell and SCell in the embodiments of the disclosure may be a PCell and an SCell defined in 5G standard 38.331 or 38.321.

In embodiments of the disclosure, the situation in which a macro cell and a pico cell are mixed may be considered. The macro cell is a cell controlled by a macro base station and provides service in a relatively large area. On the other hand, the pico cell is a cell controlled by a SeNB, and typically provides service in a significantly narrower area than the macro cell. Although there is no strict criterion for distinguishing a macro cell from a pico cell, for example, the area of the macro cell may be assumed to correspond to a radius of about 500 m, and the area of the pico cell may correspond to a radius on the order of tens of meters. In embodiments of the disclosure, the terms "pico cell" and "small cell" are interchangeably used. Here, the macro cell may be an LTE or 5G base station (MeNB or MgNB), and the pico cell may be a 5G or LTE base station (SeNB or SgNB). In particular, the 5G base station supporting the pico cell may use a frequency band of 6 GHz or more.

In embodiments of the disclosure, the situation in which a macro cell and a macro cell are mixed may be considered. The macro cell is a cell controlled by the macro base station, and provides service in a relatively large area. Here, the macro cell may include an LTE base station (MeNB) and an LTE base station (SeNB). In another embodiment, the macro cell may include an LTE (MeNB) base station and an NR base station (SgNB). In another embodiment, the macro cell may include an NR (MgNB) base station and an LTE base station (SeNB). In another embodiment, the macro cell may include an NR (MgNB) base station and an NR base station (SgNB).

Referring again to FIG. 3B, if base station 1 315 is a MeNB and base station 2 319 is a SeNB, a serving cell 310 having a center frequency f1 is a serving cell belonging to MCG and a serving cell 320 having a center frequency f2 is a serving cell belonging to the SCG.

In the following description, other terms may be used instead of MCG and SCG for ease of understanding. For example, terms such as "primary set" and "secondary set" or "primary carrier group" and "secondary carrier group" may be used. Even if different terms are used, it should be noted that only the terms used are different, and the meanings thereof are the same. The main purpose of use of these terms is to distinguish which cell is under the control of the base station controlling the PCell of a specific terminal, and the operation of the corresponding cell may differ depending on whether or not the cell is under the control of the base station controlling the PCell of a specific terminal. One or more SCGs may be configured in the terminal. The SCG may include multiple SCells, one of which has special properties.

In a CA in a conventional base station, a terminal transmits not only a hybrid automatic repeat request (HARQ) for a PCell and channel state information (CSI) (hereinafter referred to as "CSI") through a physical uplink control channel (PUCCH) (hereinafter, referred to as "PUCCH") of the PCell, but also HARQ feedback and CSI for an SCell. The transmission is performed in order to apply a CA operation to a terminal for which uplink transmission is impossible.

In case of CA operation or dual connectivity between base stations, it may be impossible in practice to transmit HARQ feedback and CSI of SCG SCells through the PUCCH of the PCell. This is because HARQ feedback should be delivered within a HARQ round trip time (RTT: hereinafter referred to as "RTT") (usually 8 ms), but the transmission delay between MeNB and SeNB may be longer than the HARQ RTT. Due to this problem, a PUCCH transmission resource is configured in one cell among SCells belonging to an SCG, and HARQ feedback and CSI for SCG SCells are transmitted through the PUCCH. The SCell above is called a PSCell. In the following description, the inter-base station CA is interchangeably used with multiple connections. Next, the connection structure of a PDCP entity according to an embodiment of the disclosure will be described with reference to FIG. 3C.

Figure 3C:
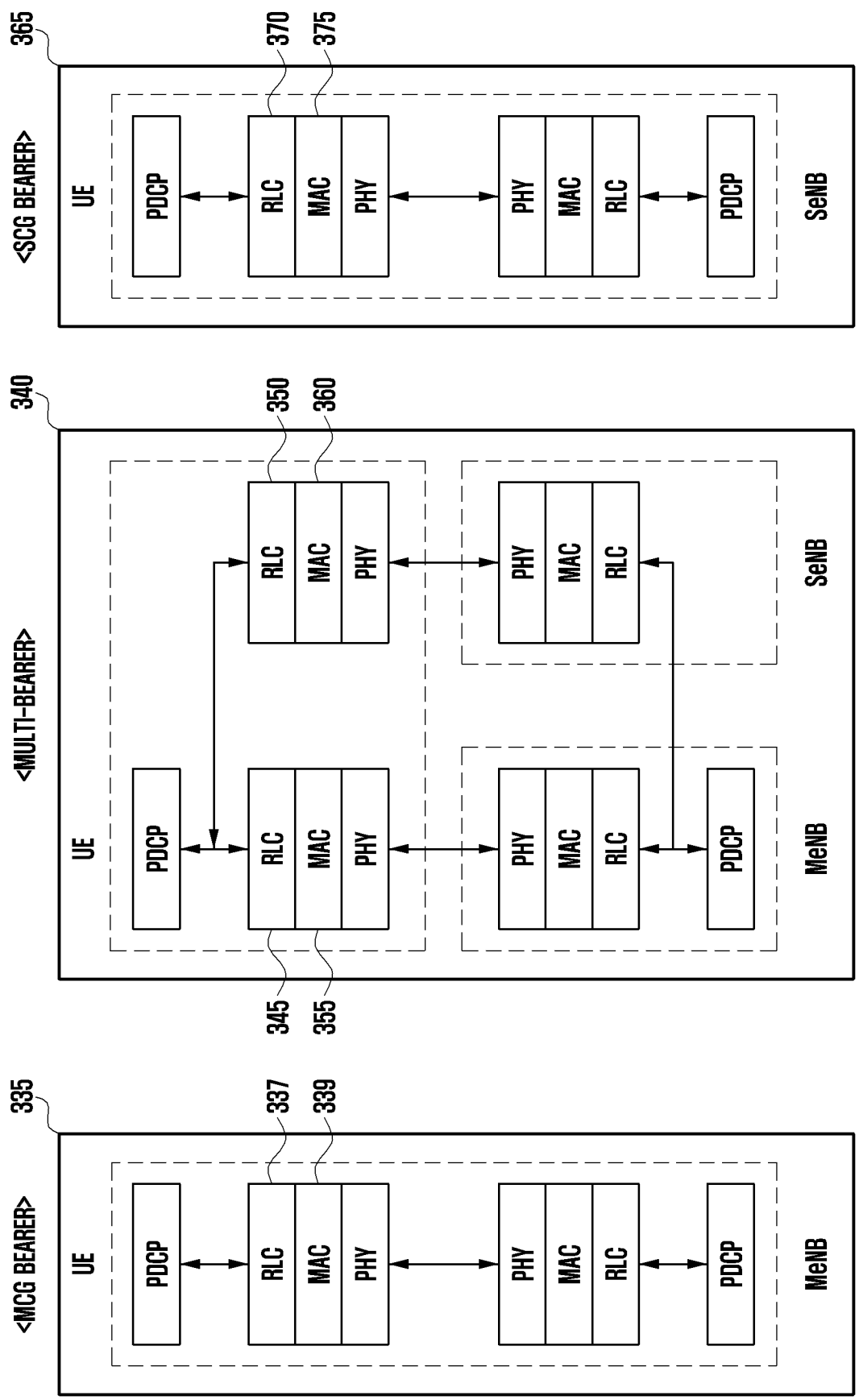
FIG. 3C schematically illustrates a connection structure of a PDCP device according to an embodiment of the disclosure.

FIG. 3C schematically illustrates the connection structure of a PDCP entity according to an embodiment of the disclosure.

Referring to FIG. 3C, for example, in the case of large volume data service, a terminal may configure two RLC entities, as shown in reference numeral 340, to transmit or receive data to or from both a MeNB and a SeNB. If the quality of service (QoS: hereinafter referred to as "QoS") requirements are stringent, such as VoLTE, the terminal may establish an RLC entity only in the MeNB, as shown in reference numeral 335, to transmit or receive data using only the serving cell of the MeNB. Alternatively, the terminal may configure a bearer such that data is transmitted or received only to or from serving cells of the SeNB, as shown in reference numeral 365.

For convenience of explanation, a bearer through which data is transmitted or received only to or from the serving cell of the MeNB, as shown in reference numeral 335, is referred to as an MCG bearer, and a bearer through which data is transmitted or received only to or from the serving cell of the SeNB, as shown in reference numeral 365, is referred to as an SCG bearer.

The PDCP entities of the MCG and SCG bearers are connected to one RLC entity, and PDCP entities of multi-bearer are connected to two RLC entities. RLC entities in which data is transmitted or received through the MCG (or connected to a MAC entity associated with the serving cells of the MCG) are referred to as MCG RLCs 337 and 345, and RLC entities in which data is transmitted or received through the SCG are referred to as SCG RLCs 350 and 370. MACs 339 and 355 related to data transmission or reception through the MCG are referred to as MCG-MAC, and the MACs 360 and 375 related to data transmission and reception through the SCG are referred to as SCG-MAC.

The MAC and RLC entities are connected using a logical channel, and a logical channel between MCG RLC and MCG-MAC is called an MCG logical channel, and a logical channel between an SCG RLC and an SCG-MAC is called an SCG logical channel. For convenience of explanation, it will be assumed that a macro cell area denotes an area in which only a macro cell signal is received without receiving a small cell signal, and that a small cell area denotes an area in which both the macro cell signal and the small cell signal are received together. When a terminal having a high demand for downlink data moves from a macro cell area to a small cell area, a small cell may be additionally configured for the terminal. A bearer having a large amount of downlink data, such as a file transfer protocol (FTP), among some bearers of the terminal, may be reconfigured as multiple bearers or SCG bearers from MCG bearers.

Meanwhile, the protocol layer may be applied to CA or DC in LTE communication system or a 5G communication system. That is, the protocol layer may be applied to CA or DC of LTE-LTE combination, LTE-NR combination, or NR-NR combination.

For example, in the case of DC of LTE-LTE combination or NR-NR combination, a PDCP entity may be established in MeNB (or MgNB), and an RLC entity may be established in each of MeNB (or MgNB) and SeNB (or SgNB), and may be connected to the PDCP entity. Accordingly, the terminal may transmit or receive data to or from the MeNB (or MgNB) and the SeNB (or SgNB) (multi-bearer). Alternatively, each of the MeNB (or MgNB) and the SeNB (or SgNB) may establish a PDCP entity and an RLC entity to transmit or receive data to or from the terminal (MCG and SCG).

Meanwhile, in the case of DC of LTE-NR combination, if the master node is a base station of an LTE communication system, a PDCP entity may be established in MgNB, and an RLC entity may be established in each of MgNB and SeNB, and may be connected to the PDCP entity. Accordingly, the terminal may transmit or receive data to or from the MgNB and the SeNB (multi bearer). Alternatively, each of the MgNB and SeNB may establish a PDCP entity and an RLC entity to transmit or receive data to or from the terminal (MCG and SCG). The same may be applied when the master node is a 5G base station.

Referring to FIGS. 2A and 2B again, reference numerals 210, 220, and 230 illustrate the DC configuration of option 3 when the core network is an EPC (LTE network) and the master node is an LTE base station.

That is, according to reference numerals 210, 220, and 230, information of a control plane (CP) may be transmitted to a terminal through the LTE base station, which is the master node, while information of the user plane (UP) may be transmitted to the terminal through various paths.

In addition, reference numeral 240 illustrates the DC configuration of option 7 when the core network is 5GC and the master node is an LTE base station.

That is, according to reference numeral 240, the CP signal may be transmitted to the terminal through the LTE base station, which is a master node, and the UP signal may be transmitted to the terminal through various paths.

In addition, reference numeral 250 illustrates the DC configuration of option 4 when the core network is 5GC and the master node is a 5G base station.

That is, according to reference numeral 250, the CP signal may be transmitted to the terminal through the 5G base station, which is a master node, and the UP signal may be transmitted to the terminal through various paths.

On the other hand, the DRX configuration is associated with the MAC, and MN and SN of the EN-DC may be configured independently, or the MN and SN may exchange the DRX configuration information with each other. In addition, EN-DC has one RRC state, which is based on MN RRC.

When the terminal operates only in 5G, it is possible that a bandwidth below 6 GHz and a bandwidth equal to or above 6 GHz are connected via DC. In addition, there may be an embodiment in which the bandwidth below 6 GHz and the bandwidth above 6 GHz are in an RRC state and a MAC for each exists. Here, both the definition and the operation of the MAC and RRC, defined in the MR-DC, may be equally applied.

Alternatively, the secondary cell in the MR-DC may operate by distinguishing only the RRC connected state and the release state. In addition, SCells other than the PSCell may be activated and/or deactivated by the MAC CE. However, the PSCell enters an activated state at the time of configuration, and this state is maintained even when there is no data to be transmitted from the PSCell. Accordingly, the activated state of the PSCell is maintained until the base station transmits a secondary node release message. Since the terminal supplies full power (starting operation of an RF device such as a power amp) in the activated state of the PSCell, the terminal consumes more current than in the idle state. However, even when there is no data to be received through the PSCell, the activated state is maintained, and thus the terminal unnecessarily consumes electricity. Accordingly, a solution to the problem is required.

In addition, referring to the DC scenario described above, since the RRC layer exists only in the master node, the master node and the secondary node operate in one RRC state. That is, the secondary node operates in the same RRC state as the RRC state of the master node. Therefore, after the secondary node is activated once, even if no data is transmitted or received to or from the secondary node, the secondary node may be activated according to the state of the master node, and the power consumption of the terminal may be unnecessarily increased. In other words, even if data is not transmitted or received to or from the secondary node once the secondary node is activated, the secondary node does not transition to RRC_IDLE but remains in the RRC_CONNECTED (ACTIVATED) state, and thus unnecessary power consumption may result. Therefore, there is a need for a solution to the above problem.

Meanwhile, the disclosure can also be applied in the dual-connectivity situation of LTE. In the disclosure, the PSCell is described as an example, but the same description applies to an SCell.

First, a method of optimizing terminal power consumption in the state in which a secondary cell is activated will be described.

1) Take Advantage of Default BWP

In one embodiment, it is possible to use a default bandwidth part (BWP) introduced in the NR in order to reduce energy consumption of a terminal in the state where PSCell is in an activated state.

The default BWP may be the same as the initial BWP, or an arbitrary resource may be configured in the base station. The default BWP may have the same frequency bandwidth as that of the initial BWP, or may be larger than the initial BWP. The default BWP may be a resource including at least one of a synchronization block (SS block) and remaining minimum system information (RSMI).

The standard defines that, if the terminal does not receive scheduling before the BWP-inactivity timer (hereinafter referred to as BWP-InactivityTimer) expires in the state where the terminal is operating in a BWP other than the default BWP, the terminal deactivates the running BWP and activates the default BWP.

The BWP-InactivityTimer is reset when a new BWP is activated or data is scheduled in the downlink. Resetting the timer may denote restarting the timer by returning the timer value to zero. If the default BWP is not explicitly set, the initial BWP may replace the default BWP.

This can also be applied to the PSCell. If the terminal does not receive resources for at least one of a downlink and an uplink from the PSCell before the BWP-InactivityTimer expires, the terminal operates as the default BWP.

2) Take Advantage of DRX Operation

In an additional embodiment, in order to reduce energy consumption of a terminal in the state where a PSCell is in an activated state, it is possible to apply a DRX operation that has been applied in LTE. When there is no data to be received or transmitted by the terminal in the DRX operation, the terminal may enter a sleep state. In addition, the terminal that has entered the sleep state can periodically decode the PDCCH. In the MR-DC, since the terminal configures separate DRX configurations for the MN and the SN, the terminal may perform the DRX for the PSCell.

In one embodiment, since the PSCell is always in an activated state, it is possible to operate in a connected DRX manner. When operating in the connected DRX, the terminal may not apply power to at least a part of an RF module in the sleep state. In one embodiment, the terminal may not apply power to the power amp. In another embodiment, power may not be applied to the base band of the terminal. In another embodiment, the terminal may apply the power of at least a part of the RF module in accordance with the time at which the PDCCH is received, based on the C-DRX information received from the base station.

If at least one resource allocation information of at least one of downlink and uplink for the terminal is transmitted through the PDCCH, the terminal remains in an active state, and if the resource allocation information for the terminal is not transmitted through the PDCCH, the terminal is changed back into a sleep state.

In another embodiment, it is also possible to operate by combining the method of 1) and the method of 2) described above in sequence. Details are described below.

Figure 4A:
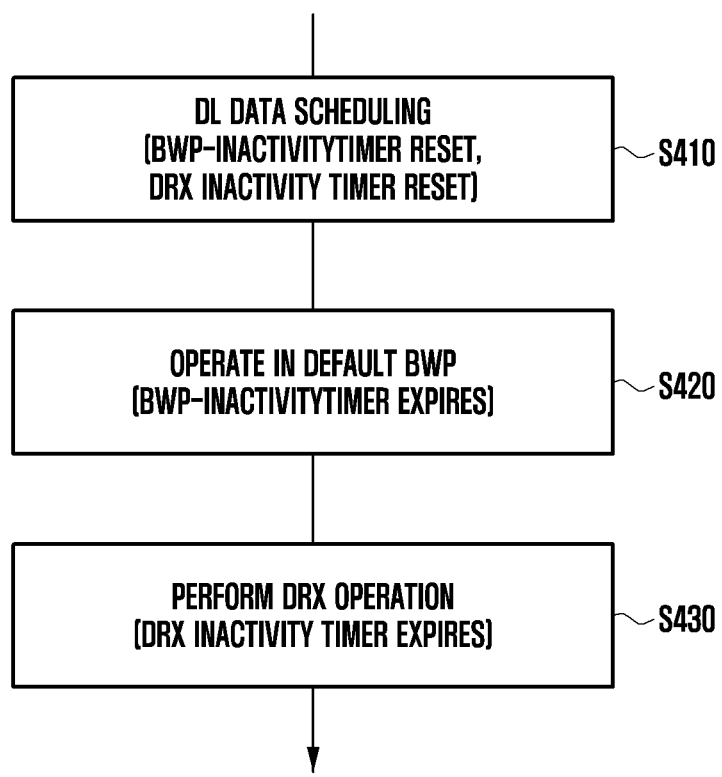
FIG. 4A illustrates an operation sequence of a terminal according to an embodiment of the disclosure.

FIG. 4A illustrates an operation sequence of a terminal according to an embodiment of the disclosure.

Referring to FIG. 4A, the terminal may receive DL data scheduling in operation S410. Accordingly, the terminal that has received the DL data scheduling may reset the BWP-Inactivity Timer and the DRX inactivity Timer at the time of receiving scheduling. Resetting the timer may denote restarting the timer by returning the timer value to zero.

Thereafter, when the BWP-InactivityTimer expires, the terminal operates as a default BWP in operation S420.

After that, when the DRX inactivity timer expires, the terminal performs a DRX operation in operation S430. This embodiment describes the operation for the case where the BWP-InactivityTimer is configured to be shorter than the DRX inactivity timer. The details thereof will be described below with reference to FIG. 4.

Figure 4B:
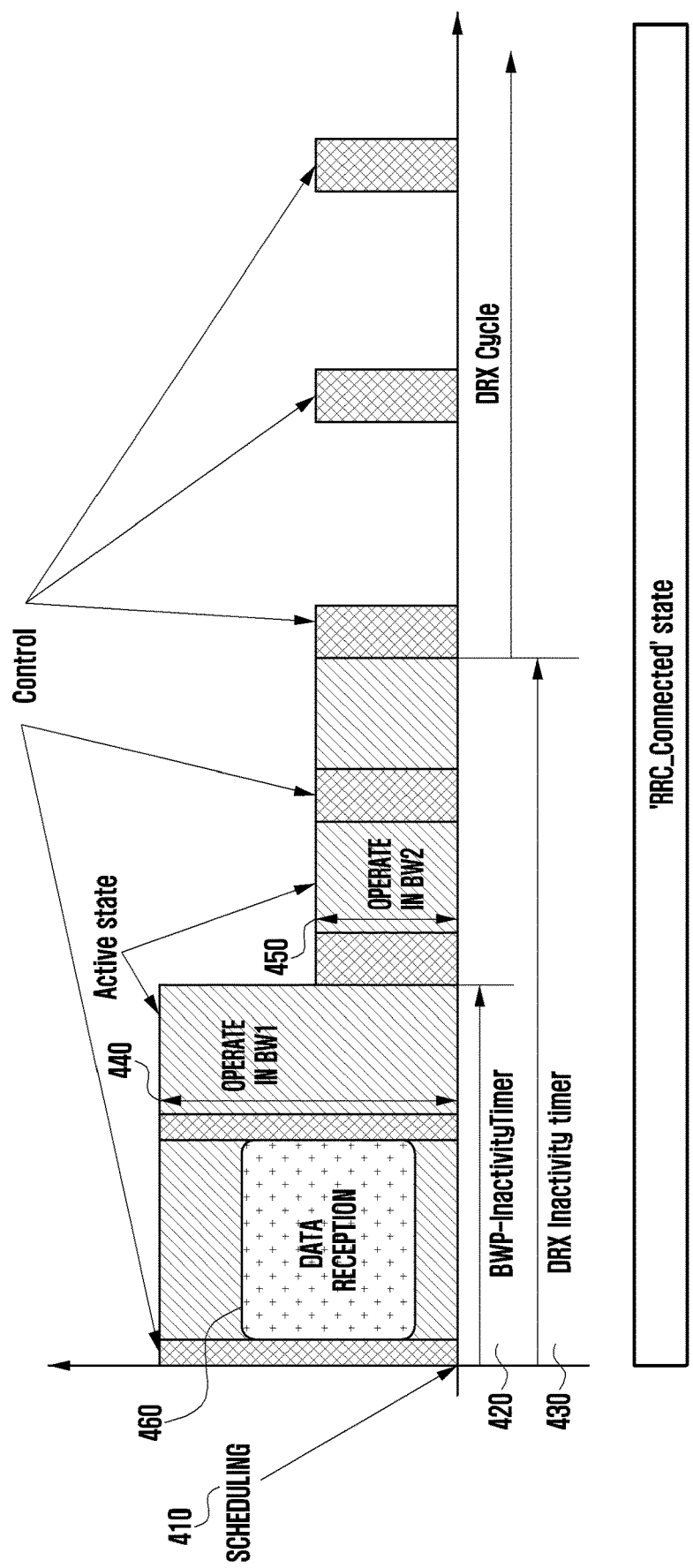
FIG. 4B illustrates a DRX operation and a BWP change operation of a terminal according to an embodiment of the disclosure.

FIG. 4B illustrates a DRX operation and a BWP change operation of a terminal according to an embodiment of the disclosure.

The terminal may reset a BWP-Inactivity timer 420 and a DRX inactivity timer 430 at a time point 410 where the scheduling is received. Here, the terminal may start a timer that is not running, or may restart the timer by returning the value of the timer that is running to zero. In this embodiment, the case where the BWP-Inactivity timer 420 is configured to be longer than the DRX inactivity timer 430 will be described as an example.

Here, the terminal may operate in BW1 (indicated by reference numeral 440), and may be in an active state.

The terminal receives data 460 according to the scheduling information. If the scheduling information is not received before the BWP-Inactivity timer 420 expires, the terminal may operate in a default BWP (BW2) (indicated by reference numeral 450). Alternatively, BW2 may denote a bandwidth smaller than BW1. In the drawing, the case where BW2 is the bandwidth of the default BWP is described as an example. However, the scope of the disclosure is not limited thereto, and as described above, it may include all cases where BW2 is configured to be smaller than BW1. In addition, the BW1 may include the case in which a default BWP operates in another bandwidth configured by the base station. As described above, the default BWP may include the case of the initial BWP. As described above, the default BWP may include the case including the SSB. As described above, the default BWP may not include the case including the SSB.

Further, if the scheduling information is not received before the DRX inactivity timer 430 expires, the terminal may perform a DRX operation. That is, the terminal may wake up from the sleep mode according to the configured DRX cycle, and may monitor the PDCCH.

Figure 5:
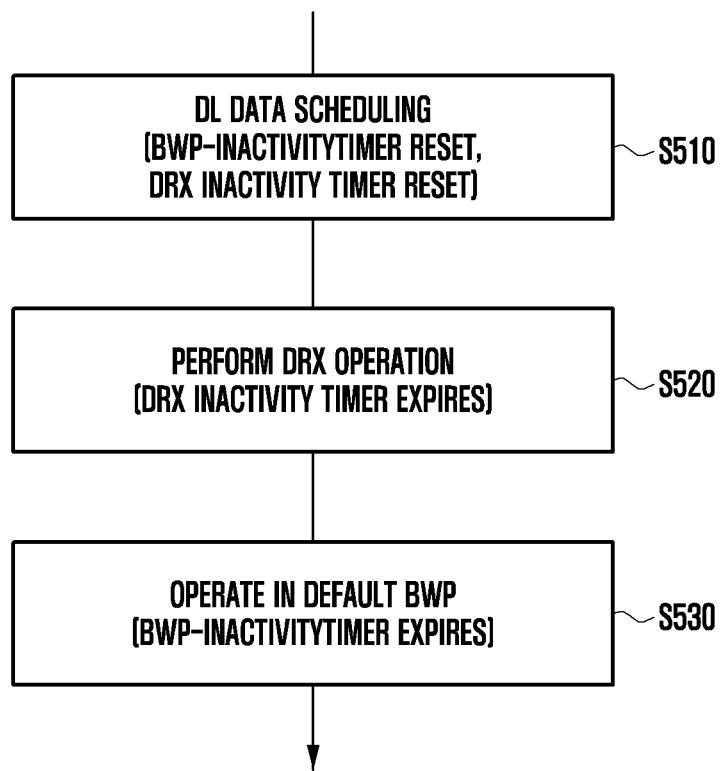
FIG. 5 illustrates another operation sequence of a terminal according to an embodiment of the disclosure.

FIG. 5 illustrates another operation sequence of a terminal according to an embodiment of the disclosure.

Referring to FIG. 5, the terminal may receive DL data scheduling in operation S510. Accordingly, the terminal that has received the DL data scheduling may reset the BWP-Inactivity Timer and the DRX inactivity timer at the time point at which the scheduling is received.

After that, when the DRX inactivity timer expires, the terminal performs a DRX operation in operation S520.

Thereafter, when the BWP-InactivityTimer expires, the terminal operates as a default BWP in operation S530. This embodiment describes the operation for the case where the BWP-InactivityTimer is configured to be longer than the DRX inactivity timer. The details thereof will be described below with reference to FIG. 6.

Figure 6:
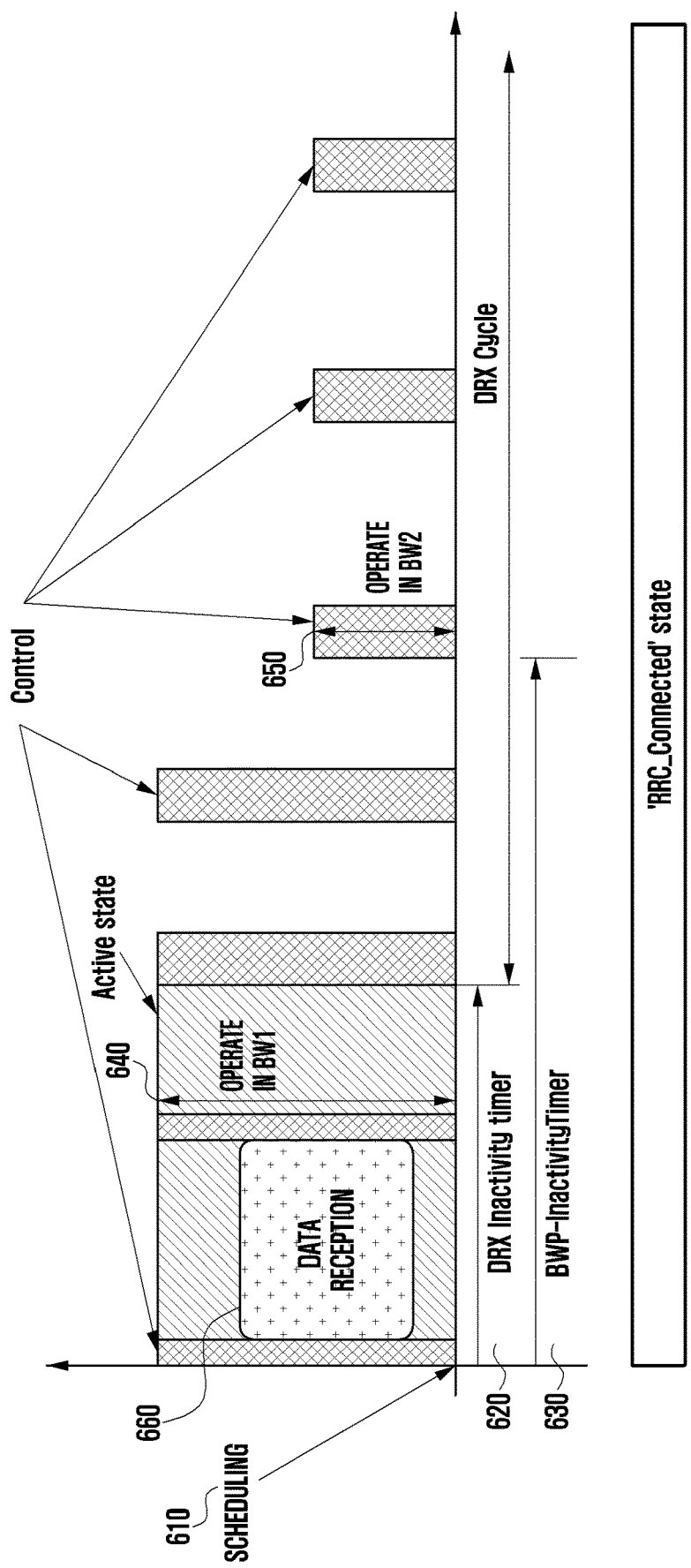
FIG. 6 illustrates another DRX operation and a BWP change operation of a terminal according to an embodiment of the disclosure.

FIG. 6 illustrates another DRX operation and a BWP change operation of a terminal according to an embodiment of the disclosure.

The terminal may start a DRX inactivity timer 620 and a BWP-Inactivity timer 630 at the time point 610 of receiving the scheduling. In this embodiment, the case where the BWP-Inactivity timer 630 is configured to be shorter than the DRX inactivity timer 620 will be described as an example.

Here, the terminal may operate in BW 1 (indicated by reference numeral 640) and may be in an activated state.

Further, the terminal receives data according to the scheduling information (indicated by reference numeral 660). In addition, if the scheduling information is not received before the DRX inactivity timer 620 expires, the terminal may start the DRX operation. That is, the terminal wakes up according to the configured DRX cycle to monitor the PDCCH.

In addition, if the scheduling information is not received before the BWP-Inactivity Timer 630 expires, the terminal may operate in a default BWP (BW2) (indicated by reference numeral 650). Alternatively, BW2 may denote a BW smaller than BW1. In the drawing, the case where BW2 is the BW of the default BWP will be described by way of example. However, the scope of the disclosure is not limited thereto, and as described above, the case may include all cases in which BW2 is configured to be smaller than BW1. In addition, BW1 may include the case where the BW of the default BWP operates as another BW configured by a base station. As described above, the default BWP may include the case of an initial BWP. As described above, the default BWP may include the case including the SSB. As described above, the default BWP may not include the case including the SSB.

Meanwhile, the terminal may receive a secondary release message from the base station to release the terminal configuration for the secondary node (SN). Therefore, the disclosure further proposes a method for transmitting a release request message to the base station by the terminal. In addition, since it is necessary to perform SN addition through RRC signaling in order to reconnect the released SN, the above method should be used when it is determined that data will not be transmitted for a predetermined period of time. Therefore, a method for calculating the time point at which to transmit a release request message is proposed.

Figure 7A:
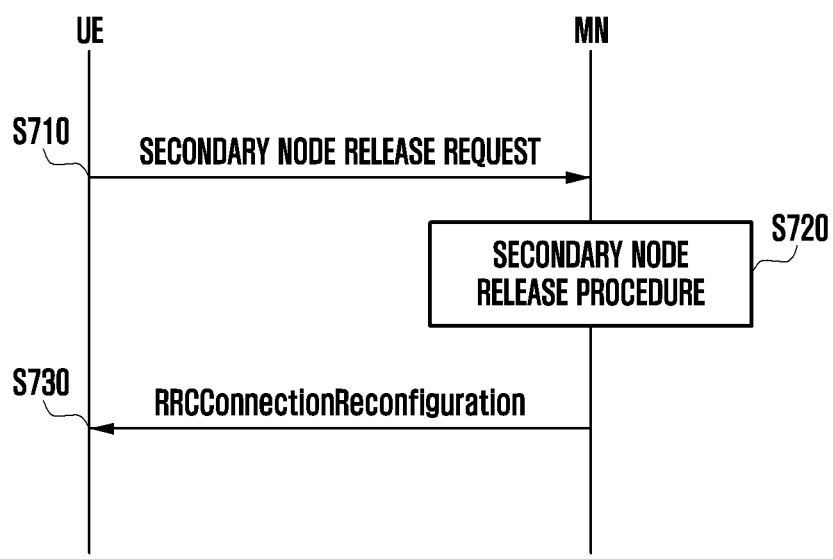
FIGS. 7A and 7B illustrate a method for requesting release of a secondary node by a terminal according to an embodiment of the disclosure.
Figure 7B:
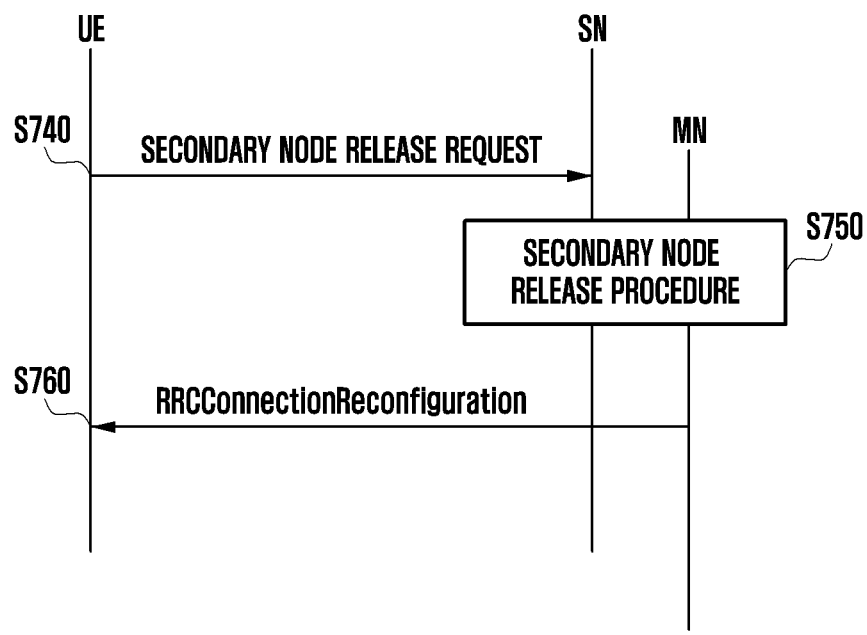

FIGS. 7A and 7B illustrate a method for requesting release of a secondary node by a terminal according to an embodiment of the disclosure.

Referring to FIG. 7A, the terminal may transmit a secondary node release request message to a master node in operation S710. That is, when it is determined that there is no data to be transmitted or received through the PSCell or the SCell, the terminal may request the release of the secondary node by transmitting the above message in order to reduce power consumption by the terminal. Here, the terminal may use at least one of messages of a physical (PHY) layer, a media access control (MAC) layer, or a radio resource control (RRC) layer through a resource allocated by the master node. Details thereof will be described later.

Accordingly, the master node may perform the release procedure of the secondary cell in operation S720, and may transmit an RRCConnectionReconfiguration message to the terminal in operation S730.

Alternatively, referring to FIG. 7B, the terminal may transmit a secondary node release request message to the secondary node in operation S740. That is, unlike FIG. 7A, the terminal may directly transmit the secondary node release request to the secondary node using at least one of messages of the PHY, MAC, and RRC layers through the resources allocated by the secondary node.

Here, the secondary node may transmit the request to the master node, and the master node may perform the secondary node release procedure in operation S750. In operation S760, the master node may transmit an RRCConnectionReconfiguration message to the UE.

Here, a specific method of transmitting the secondary node release request message will be described below.

1) Method for Using RRC Messages

The terminal may transmit a "Secondary Node Release Request" by transmitting at least one of RRC signals already defined in RRC to the base station. In one embodiment, a method for "Secondary Node Release Request" is possible through an RRCConnectionReestablishmentRequest message.

For example, it is possible to add a bit to the RRCConnectionReestablishmentRequest to indicate "Secondary Node Release Request".

In another embodiment, a method of adding a new RRC message for "Secondary Node Release Request" is also possible. Here, when there is no allocated uplink (UL) resource, the terminal requests UL resources from the base station in order to perform RRC transmission and transmits an RRC message (a secondary node release message) using the allocated resource. Here, the operation of the DRX inactivity timer, the BWP inactivity timer, or the data inactivity timer may not be affected.

If there is an allocated UL resource, the terminal may perform the RRC message (secondary node release message) transmission using the corresponding resource. Here, the allocated UL resource may be one of a granted resource, a grant-free type 1 resource, and a grant-free type 2 resource.

Details of the time point at which the terminal transmits the message will be described later.

2) Method of Using MAC Messages

The terminal may transmit a "Secondary Node Release Request" by transmitting at least one of MAC signals already defined in MAC to the base station.

In one embodiment, a method for "Secondary Node Release request" is possible through the MAC CE. For example, it is possible to add an ID for "Secondary Node Release Request" to an LCG ID list included in the MAC CE. Here, when there is no allocated UL resource, the terminal requests UL resources from the base station in order to perform MAC CE transmission and performs MAC CE transmission using the allocated resources. Here, the operation of the DRX inactivity timer, the BWP inactivity timer, or the data inactivity timer may not be affected.

If there is an allocated UL resource, the terminal may perform MAC CE transmission using the corresponding resource. Here, the allocated UL resource may be one of a granted resource, a grant-free type 1 resource, and a grant-free type 2 resource.

3) Method of Using PHY Signals

The terminal may transmit a "Secondary Node Release Request" by transmitting at least one of PHY signals defined by the PHY to the base station.

In one embodiment, a method of using the SR defined in the PHY of the NR is possible. In another embodiment, a method of newly defining a logical ID for a "Secondary Node Release Request" and including the logical ID in an SR configuration is possible. The terminal transmits an SR signal to the SR resource associated with the designated logical ID and transmits a "Secondary Node Release Request" message.

In another embodiment, a method in which when there is a UL-SCH resource allocated to the terminal in the RRC_CONNECTED state, in the case of receiving the SR from the terminal through the logical ID associated with the UL-SCH resource, the base station interprets the SR as "Secondary Node Release Request" is possible. That is, when there is an UL-SCH resource allocated in the RRC_CONNECTED state, the terminal transmits an SR signal through a logical ID associated with the UL-SCH resource and transmits a "Secondary Node Release Request" message.

In another embodiment, a method of transmitting a "Secondary Node Release Request" message in addition to the SR resource configured in the SR configuration is possible. The terminal may add 1 bit for transmission of the "Secondary Node Release Request" message to the SR configuration to indicate whether the request is possible using the corresponding SR resource.

According to an embodiment, when it is indicated that the request is possible using an SR resource, when there is an UL-SCH resource allocated in the RRC_CONNECTED state, the terminal transmits an SR signal through a logical ID associated with the UL-SCH resource to transmit a "Secondary Node Release Request" message. In an embodiment, when it is indicated that the request is possible through the SR resource, the terminal transmits a signal (phase change, bit information change, etc.) which differs from the SR signal through the logical ID associated with the UL-SCH resource, and transmits a "Secondary Node Release request" message.

It is also possible to combine at least two of the above approaches.

Meanwhile, a method of determining the time point at which to transmit the secondary node release request will be described below.

The terminal needs to be able to calculate the time point at which to transmit the message "Secondary Node Release Request". Accordingly, a process of determining, by the terminal, that the connection with the SN is no longer needed is required.

In an embodiment according to the method of performing the above determination, the terminal may make a determination based on whether an APP requiring data transmission through the SN is running More specifically, for example, when an AR APP is terminated in the situation in which data is received through the SN (e.g., a 5G network) for the AR APP, the terminal may determine that the connection with the SN is not necessary. The terminal may also perform the determination in a module included in the AP. In another embodiment, the terminal may perform the determination in a module included in the CP. More specifically, it is possible to perform the determination in the PDCP layer or the RRC layer.

In another embodiment according to the method of performing the above determination, the terminal may determine the time point at which to release SN based on information received from the MN. In an embodiment, a method of utilizing timer information (for example, information related to datainactivitytimer) configured to switch from the RRC_CONNECTED state of the MN to the RRC_IDLE state is possible.

More specifically, the terminal starts the datainactivitytimer for the SN at the time point at which the SN receives scheduling. Further, if the SN does not receive resource scheduling for the downlink or uplink before the timer becomes to have a value equal to the expiration value of the datainactivitytimer received from the MN (that is, before the datainactivitytimer of the SN expires), the terminal may determine that it is no longer necessary to hold the SN, and may transmit a "Secondary Node Release Request" message. To this end, the terminal needs to include datainactivitytimer for SN release separately from datainactivitytimer for the MN.

In another embodiment, a method of directly indicating, by the MN or the SN, the time point at which to release the SN, is possible. In more detail, the information (information relating to the time point at which to release the SN) may be included in a message (for example, RRCConnectionReconfiguration) transmitted for SN addition or SN Modification. Alternatively, a method in which the above information is included in system information transmitted from the SN or the MN is possible. In an embodiment, a method of transmitting information related to a datainactivitytimer for transmission of SN release to the terminal is possible.

More specifically, the terminal starts (or resets) the datainactivitytimer for the SN release at the time point at which the SN receives scheduling. Further, if the SN does not receive resource scheduling for the downlink or uplink before the timer becomes to have a value equal to the expiration value of the datainactivitytimer received from the MN (that is, before the datainactivitytimer of the SN expires), the terminal may determine that it is no longer necessary to hold the SN, and may transmit a "Secondary Node Release Request" message. To this end, the terminal needs to include a separate timer for SN.

The method of transmitting a "Secondary Node Release Request" message may be performed in combination with methods described above. Details thereof will be described with reference to FIGS. 8 to 9. However, although not shown in the drawings, a process of operating in a default BWP or a process of operating in a DRX cycle may not be included.

FIG. 8 illustrate an operation sequence in which a terminal transmits a secondary node release request message according to an embodiment of the disclosure.

Figure 8A:
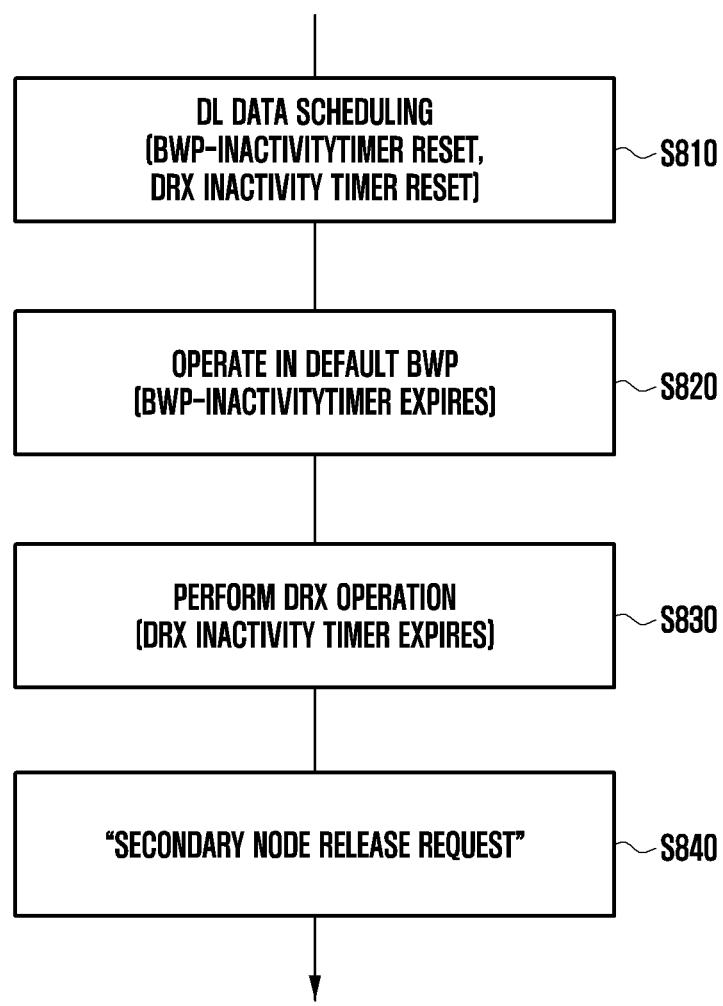
FIGS. 8A and 8B illustrate an operation sequence in which a terminal transmits a secondary node release request message according to an embodiment of the disclosure.
Figure 8B:
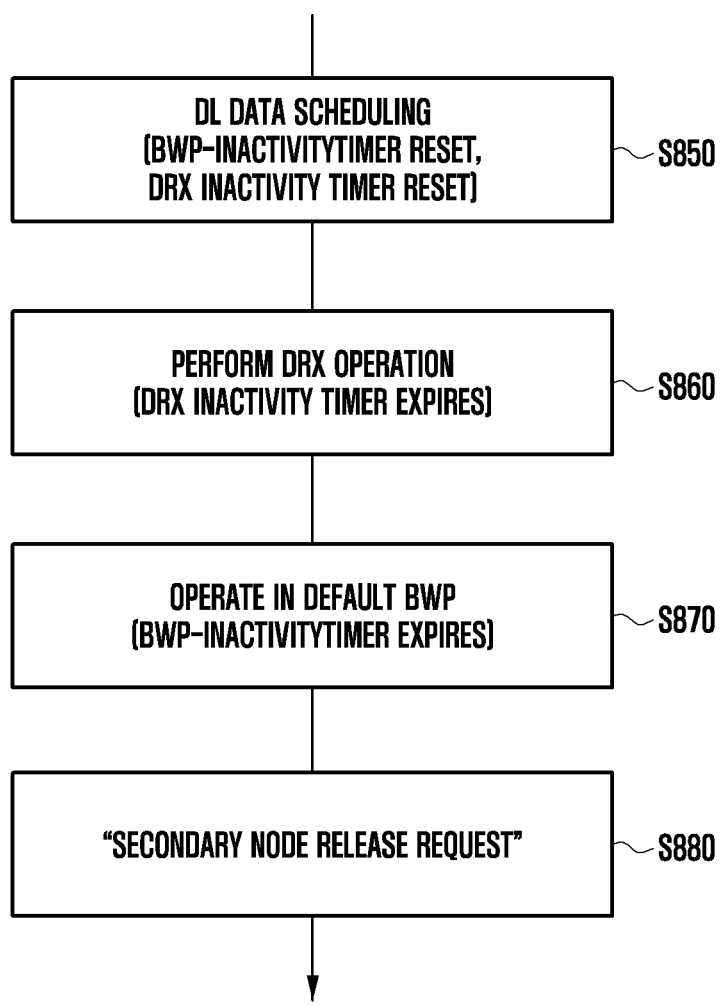

Operations S810 to S830 of FIG. 8A are the same as operations S310 to S330 of FIG. 3, and operations S850 to S870 of FIG. 8B are the same as operations S340 to 5360 of FIG. 3.

When the BWP-InactivityTimer expires and the DRX inactivity timer expires, the terminal may transmit a secondary node release request to the base station in operation S840 or operation S880. In one embodiment, the terminal may transmit the secondary node release request to the base station when the longer timer among the BWP-InactivityTimer and the DRX inactivity timer expires. In another embodiment, the terminal defined above may transmit the secondary node release request to the base station when a timer for SN Release (at least one of a datainactivitytimer received from MN, a separate timer for SN release, and a datainactivitytimer received from SN) expires. In another embodiment, when one of the BWP-InactivityTimer and the DRX inactivity timer expires, the terminal may transmit the secondary node release request to the base station.

In another example, as described above, a process of operating in a default BWP or a process of operating in a DRX cycle may not be included.

In addition, as described above, a timer (datainactivitytimer) for switching from the RRC_CONNECTED state to the RRC_IDLE state may be configured. When the timer expires, the terminal may transmit the secondary node release request to the base station.

Figure 9A:
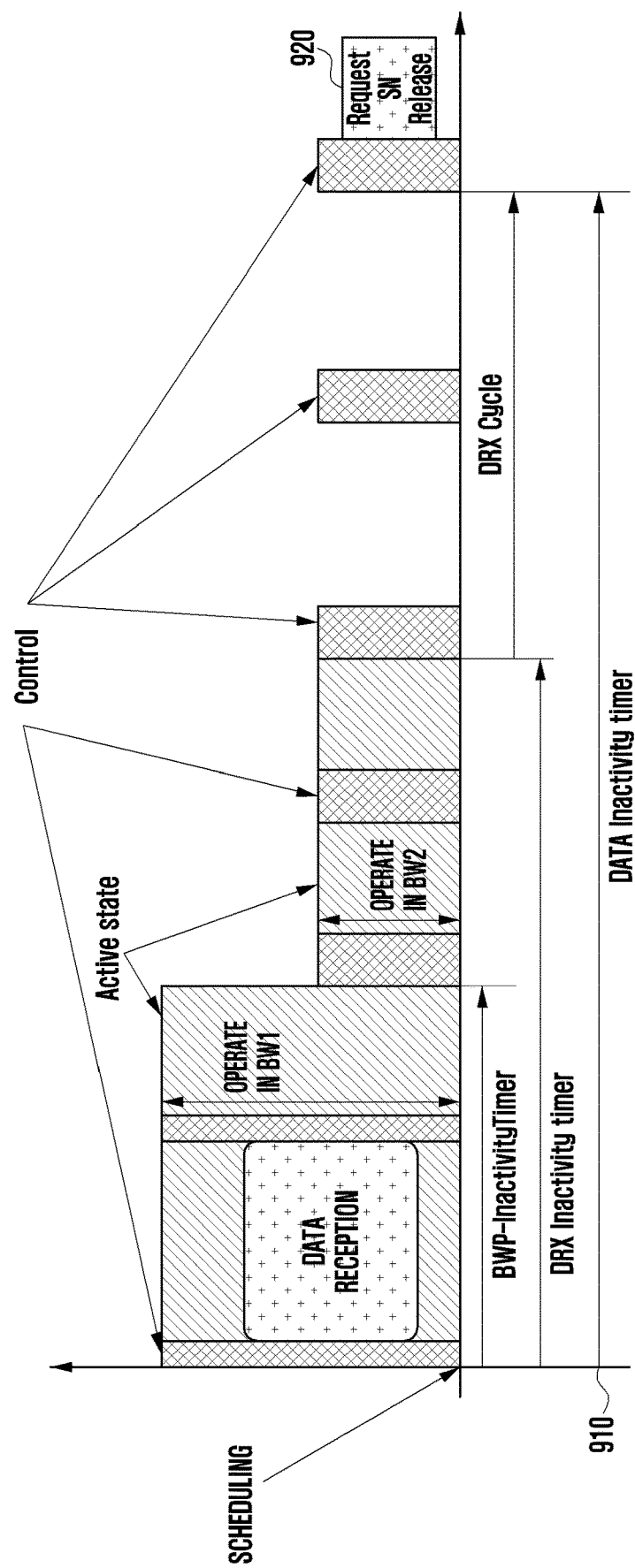
FIGS. 9A and 9B illustrate a method for transmitting a secondary node release request message by a terminal according to an embodiment of the disclosure.
Figure 9B:
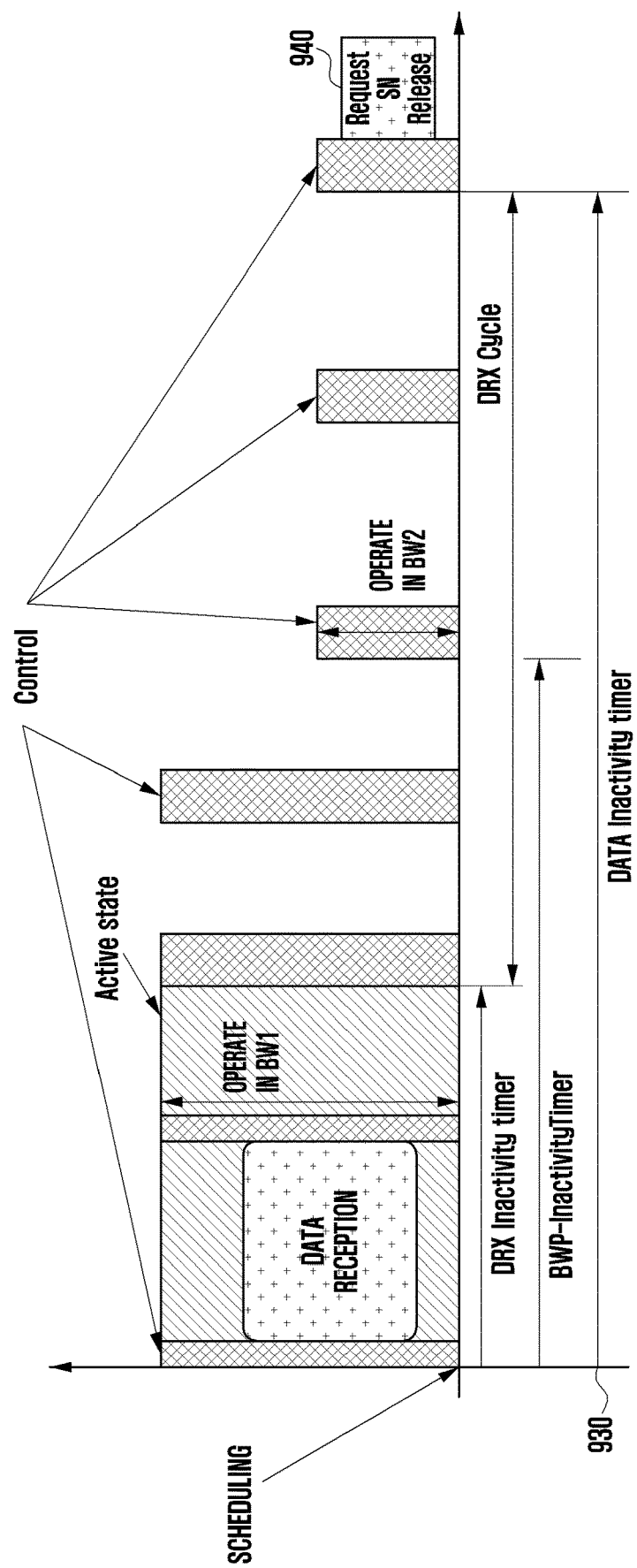

FIGS. 9A and 9B illustrate a method for transmitting a secondary node release request message by a terminal according to an embodiment of the disclosure.

FIGS. 9A and 9B may be seen to operate similarly to FIGS. 3 and 5, respectively. FIGS. 9A and 9B illustrate the case where a data inactivity timer is further configured. Accordingly, referring to FIGS. 9A and 9B, when data inactivity timers 910 and 930 expire, the terminal may transmit a release request message (indicated by reference numerals 920 and 940).

However, in the drawings, the case where the data inactivity timer is configured to be longer than the BWP-inactivityTimer and the DRX inactivityTimer is described by way of example, but there may be the case where the data inactivity timer is shorter than the BWP-inactivityTimer and the DRX inactivityTimer. Here, the terminal does not transmit the release request even when the datainactivity timer expires. However, the terminal may transmit the release request when at least one timer among the BWP-inactivityTimer and the DRX inactivityTimer expires or when the timer configured to be longer among the BWP-inactivityTimer and the DRX inactivityTimer expires.

Meanwhile, if the terminal determines that there is no data in the MN or the SN, the terminal may request the base station to change the terminal into the RRC_IDLE state. That is, the disclosure proposes a method for transmitting an RRC Connection Release request message by a terminal to a base station. In order to reconnect the released MN and the SN, connection through RRC signaling needs to be performed. Therefore, the method should be used when it is determined that there is no data transmission for a predetermined period of time. Therefore, the disclosure proposes a method for calculating a time point at which to transmit a release request message.

Figure 10:
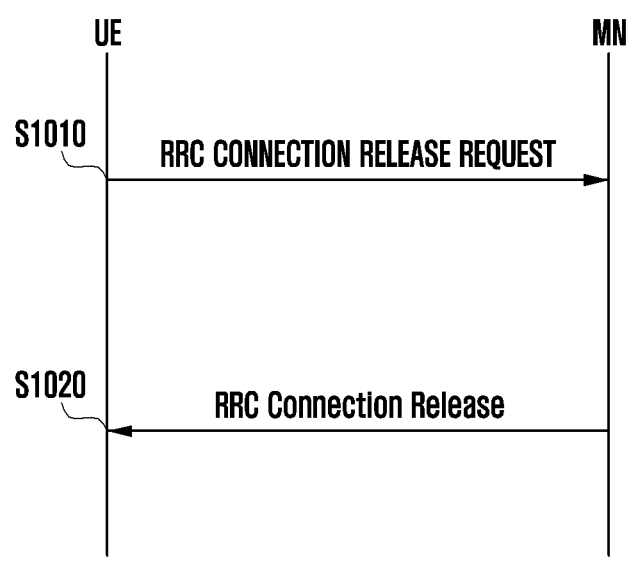
FIG. 10 illustrates a method for requesting RRC connection release by a terminal according to an embodiment of the disclosure.

FIG. 10 illustrates a method for requesting an RRC connection release by a terminal according to an embodiment of the disclosure.

Referring to FIG. 10, the terminal may transmit an RRC connection release request message to the MN in operation 51010. That is, when it is determined that there is no data to be transmitted or received through the MN and the SN, the terminal may request the release of the secondary node by transmitting the above message to reduce the power consumption by the terminal. Here, the terminal may use at least one of messages of the PHY, MAC, and RRC layer through resources allocated by a master node, since the details are the same as those set forth above, and will be omitted below.

Meanwhile, the terminal needs to be able to calculate the time point at which the "RRC connection release request" message is transmitted. Accordingly, the terminal requires a process of determining that the connection between the MN and the SN is no longer needed. That is, the terminal may make a determination based on whether or not an APP requiring data transmission is executed. The details are the same as those set forth above.

In another embodiment, the terminal may determine the time point at which the RRC connection is to be released based on the information received from the MN. As an embodiment, a method of utilizing timer information (for example, information related to datainactivitytimer) configured to switch from the RRC_CONNECTED state of the MN to the RRC_IDLE state is possible. More specifically, the terminal starts a timer at the time point at which the MN and SN receive final scheduling. Further, if the MN and SN do not receive resource scheduling for the downlink or uplink before the timer becomes to have a value equal to the expiration value of the datainactivitytimer received from the MN RRC (that is, when the datainactivitytimer expires), the terminal may determine that it is no longer necessary to hold the MN and SN, and may transmit a "Secondary Node Release Request" message.

In addition, the details of FIGS. 8 to 9 described above may also be applied to this embodiment. That is, the terminal may transmit the RRC connection release request message by combining the above descriptions, and may not include a process of operating in a default BWP or a process of operating in a DRX cycle. When the RRC connection release request message is transmitted in order to release the MN and the SN, the secondary node release request of FIGS. 8 to 9 may be replaced with the RRC connection release request.

Figure 11A:
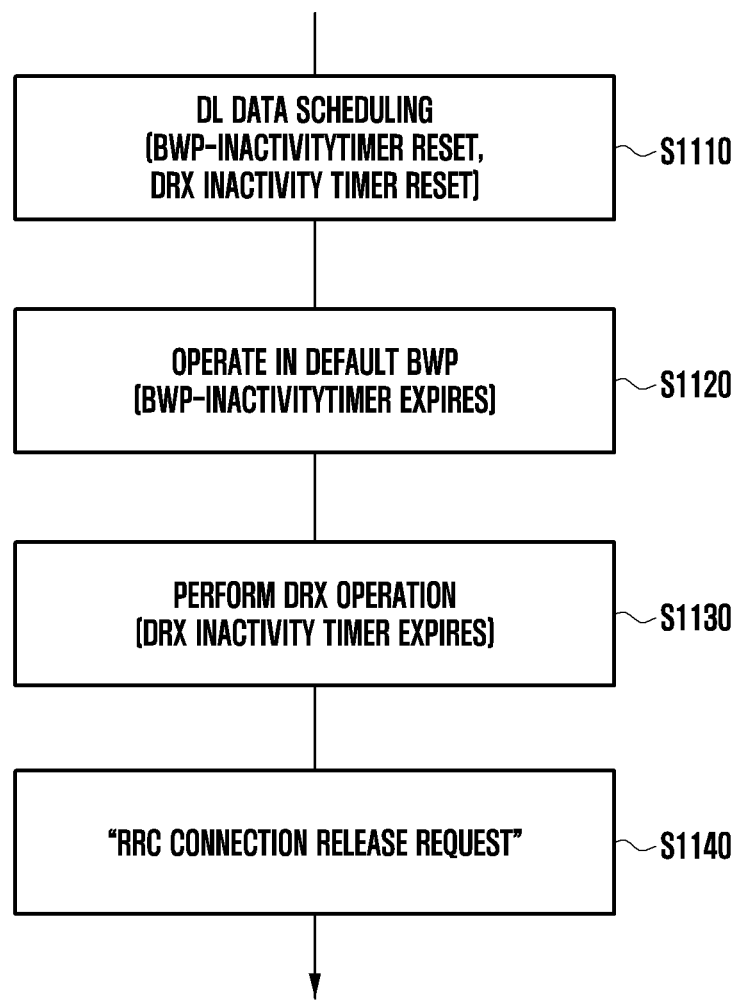
FIGS. 11A and 11B illustrate an operation sequence in which a terminal transmits an RRC connection release request message according to an embodiment of the disclosure.
Figure 11B:
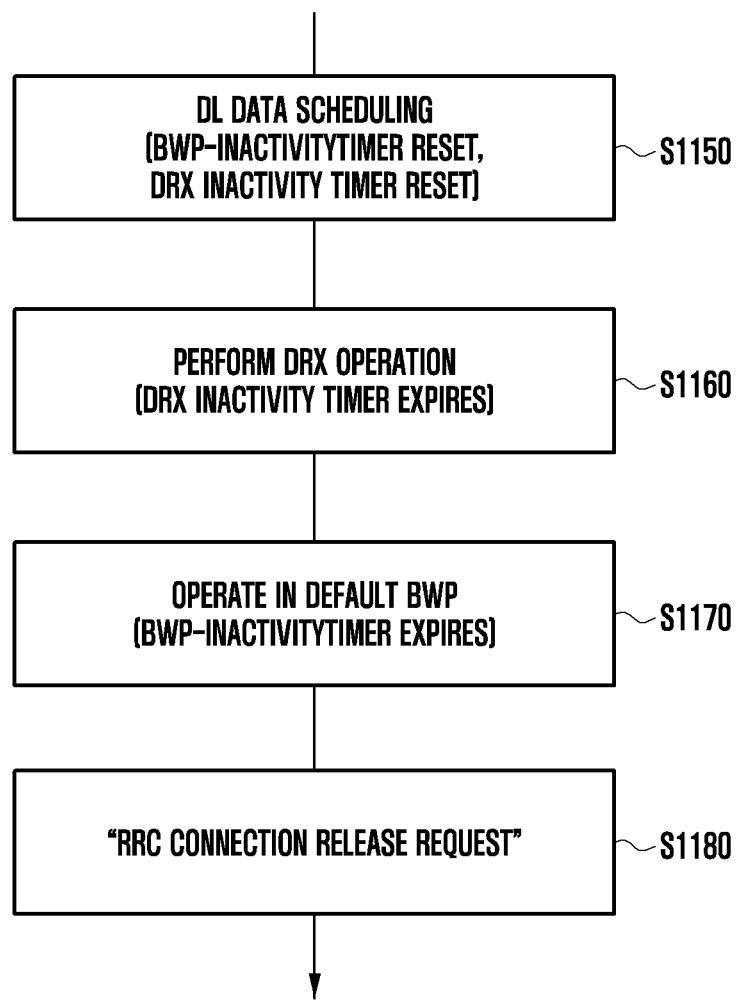

FIGS. 11A and 11B illustrate an operation sequence in which a terminal transmits an RRC connection release request message according to an embodiment of the disclosure.

In FIG. 11A, operations 51110 to 51130 are the same as operations S810 to S830, and operations 51150 to S170 in FIG. 11B are the same as operations S850 to S870 in FIG. 8B.

When the BWP-InactivityTimer expires and the DRX inactivity timer expires, the terminal may transmit an RRC connection release request to the base station in operation 51140 or operation 51180. The details are the same as those set forth above, and will be omitted below.

Figure 12A:
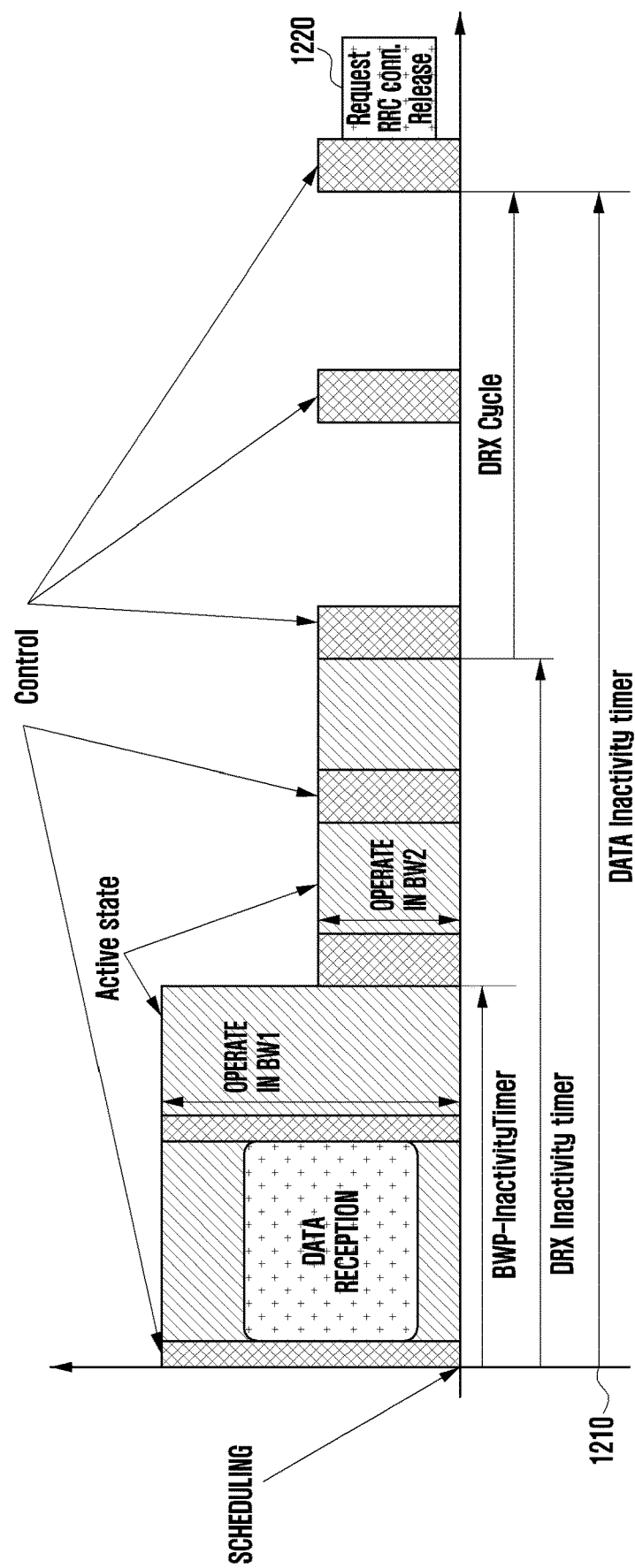
FIGS. 12A and 12B illustrate a method for transmitting an RRC connection release request message by a terminal according to an embodiment of the disclosure.
Figure 12B:
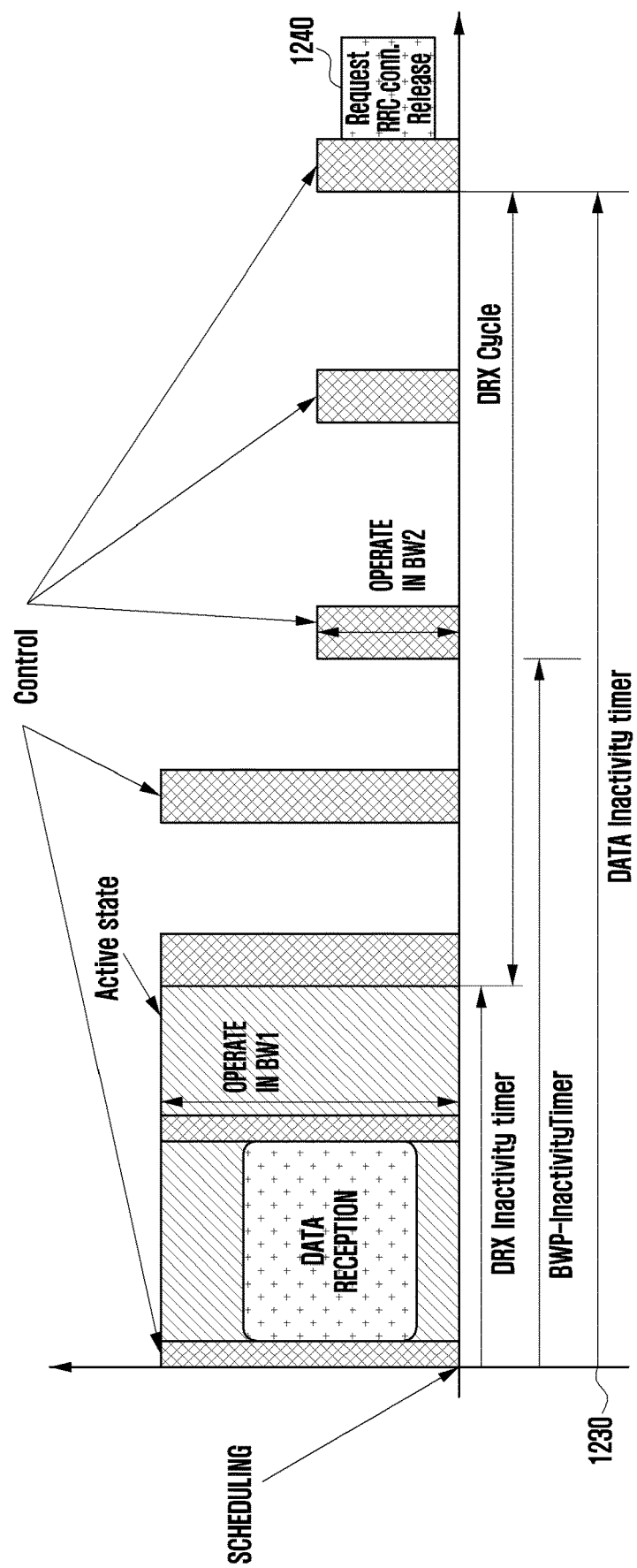

FIGS. 12A and 12B illustrate a method for transmitting an RRC connection release request message by a terminal according to an embodiment of the disclosure.

FIGS. 12A and 12B can be seen to operate similarly to FIGS. 9A and 9B. Thus, referring to FIGS. 12A and 12B, when data inactivity timers 1210 and 1230 expire, the terminal may transmit an RRC connection release request message (indicated by reference numerals 1220 and 1240). Other details are the same as those set forth above.

Meanwhile, an "RRC connection release request" message and a "secondary node release request" message may be signals having the same contents. According to an embodiment, when an MN receives one signal, it may be interpreted as an "RRC connection release request", and when an SN receives one signal, it may be interpreted as a "secondary node release request". The two messages may be defined independently of each other, and may include different contents. In addition, a method in which one signal includes both messages but is separated by bit, bit map, or ID values is possible.

In another embodiment, a method in which only one of the two messages is defined and used is also possible.

Meanwhile, even when there is data transmitted or received through the SN in the MR-DC, if the terminal is changed to the RRC_IDLE state, since the communication between the terminal and the SN may be stopped, the RRC_CONNECTED state of the terminal needs to be maintained. However, since the RRC state of the terminal operates based on the RRC state of the MN, in some networks, even when data is transmitted through the SN, when the RRC_IDLE transition condition is satisfied in the RRC layer of the MN, the case where the RRC state of the MN transitions to RRC_IDLE may occur. Here, since the phenomenon, in which data received by the terminal through the SN is interrupted, may occur, a method for preventing this is proposed.

In the case where datainactivitytimer expires, the RRC of the MN transitions to RRC_IDLE. In more detail, when the connected DRX operates, power supply to modules that are not associated with the SN among modules associated with the MN may be stopped. After that, when the datainactivitytimer expires because there is no downlink data, the terminal and the base station transition to RRC_IDLE. When MAC SDUs for DTCH, DCCH, and CCCH are received in the MAC layer, the datainactivitytimer may be reset or restarted.

Accordingly, the disclosure proposes a method by a terminal for preventing the datainactivitytimer of the base station from expiring. According to at least one of the methods described below, the terminal intends to prevent the MN from transitioning to RRC_IDLE.

1) Method of Using RRC Messages

The terminal may transmit at least one of RRC signals defined in RRC to the base station to maintain the MN in the RRC_CONNECTED state. According to an embodiment, the terminal may transmit an RRCConnectionReestablishmentRequest message.

When the RRCConnectionReestablishmentRequest is received in the RRC_CONNECTED state, the base station transmits an RRC ConnectionReestablishment message in response thereto, and thus has the effect of resetting the datainactivitytimer.

In order to reduce the signaling load, the request message may include information indicating that the MN is a request message for maintaining the RRC_CONNECTED state due to the SN. Therefore, when the base station identifies that the request message is for maintaining the RRC_CONNECTED state, only the datainactivitytimer may be reset without transmitting a separate response message for the request.

If there is no allocated UL resource, the terminal may request a UL resource from the base station in order to transmit the RRC message, and may transmit the RRC message using the allocated resource. Here, the operation of the DRX inactivity timer, the BWP inactivity timer, or the data inactivity timer may not be affected.

If there is an allocated UL resource, the terminal may transmit an RRC message using the corresponding resource. Here, the allocated UL resource may be one of a granted resource, a grant-free type 1 resource, and a grant-free type 2 resource.

2) Method of Using Higher Layer Messages

Since a terminal can determine that it is connected through EN-DC, a method of transmitting an arbitrary message to LTE in a higher layer of the terminal is possible. It is also possible to generate a message in a TCP layer of the terminal. Alternatively, it is also possible to generate a message in an application layer of the terminal. For example, it is also possible to transmit a ping message to LTE through a well-known external server (e.g., a www-.google.com server).

Here, when there is no allocated UL resource, the terminal requests the UL resource from the base station in order to transmit higher-layer messages, and transmits the higher-layer messages by using the allocated resource. Here, the operation of the DRX inactivity timer, the BWP inactivity timer, or the data inactivity timer may not be affected.

If there is an allocated UL resource, the terminal may transmit a higher-layer message using the corresponding resource. Here, the allocated UL resource may be one of a granted resource, a grant-free type 1 resource, and a grant-free type 2 resource.

3) Method of Using MAC CE Messages

The terminal may transmit the MAC CE message to the base station to allow the MN to be maintained in an RRC_CONNECTED state. According to an embodiment, the terminal may transmit one of predefined MAC CE messages. The base station transmits a response message corresponding to each MAC CE transmitted by the terminal in response thereto, and thus has the effect of resetting the datainactivitytimer.

In order to reduce the load of signaling, the request message may include information indicating that the MN needs to be maintained in the RRC_CONNECTED state due to the SN. Therefore, even when the base station does not transmit a separate response message for the request, the datainactivitytimer may be reset.

If there is no allocated UL resource, the terminal may request the UL resource from the base station in order to transmit the MAC CE message, and may transmit the MAC CE message using the allocated resource. Here, the operation of the DRX inactivity timer, the BWP inactivity timer, or the data inactivity timer may not be affected.

If there is an allocated UL resource, the terminal may perform the MAC CE message transmission using the corresponding resource. Here, the allocated UL resource may be one of a granted resource, a grant-free type 1 resource, and a grant-free type 2 resource. To this end, when the MAC CE is received in the MAC layer, it can be defined in the standard as shown in <Table 2> below so that at least one of start and restart of the data inactivity timer can be performed.

TABLE 2

The MAC entity may be configured by RRC
with a Data inactivity monitoring
functionality, when in RRC_CONNECTED.RRC
controls Data inactivity operation by
configuring the timer DataInactivityTimer.
When DataInactivityTimer is configured. the MAC entity shall:
if the MAC entity receives theMAC CE, the MAC SDU
for DTCH logical channel, DCCH logical channel,
or CCCH logical channel; or
if the MAC entity transmits theMAC CE, the MAC SDU
for DTCH logical channel, DCCH logical channel;
start or restart DataInactivityTimer.
if DataInactivityTimer expires, indicate the expiry of
DataInactivityTimer to upper layers.

On the other hand, the above method does not need to operate in every network. There may be a base station that manages one RRC state according to the standard and maintains the RRC_CONNECTED state when there is data in the SN. However, since there may also be a base station in which the problem raised above occurs, the terminal needs to distinguish the same in order to determine whether to perform the operation described above. Therefore, a method of distinguishing this is proposed below.

1) Identification of Network Information (MCC/MNC)

According to an embodiment, a determination method based on information of a base station camped on by a terminal is possible. The terminal may identify the operation state of the corresponding network or the base station based on a global cell ID included in the system information transmitted from the base station or the MCC/MNC. The network information having a problem described above may be stored in the terminal in advance, and the terminal may change operations according to the identified system information.

In addition, when the terminal is switched to RRC_IDLE during data transmission through the SN, it is also possible to store the system information of the base station in the DB to update the information. The DB may be stored in a separate server inside the terminal or outside the terminal.

Meanwhile, when the terminal operates only in 5G, it is possible that a bandwidth below 6 GHz and a bandwidth above 6 GHz are connected to DC. In addition, there may be an embodiment in which the bandwidth below 6 GHz and the bandwidth above 6 GHz are in an RRC state and a MAC for each exists. Here, both the definition and the operation of the MAC and RRC defined in MR-DC may be equally applied.

Figure 13:
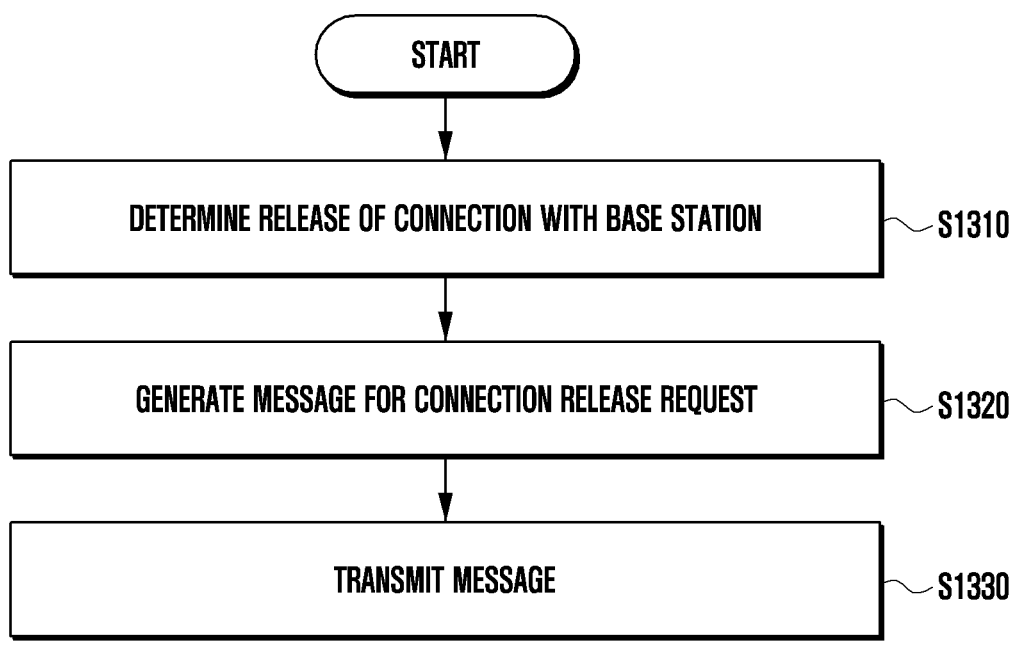
FIG. 13 illustrates an operation sequence of a terminal according to an embodiment of the disclosure.

FIG. 13 illustrates an operation sequence of a terminal according to an embodiment of the disclosure.

Referring to FIG. 13, in operation S1310, a terminal may determine to release a connection with a base station or node.

Here, the release may include release of a connection with a secondary node or release of connections both with a master node and with the secondary node. The terminal may determine whether to perform connection release using the above-described method, and a detailed description thereof will thus be omitted.

In operation S1320, the terminal may generate a connection release request message. The terminal may generate an RRC message to release a connection with the secondary node or a connection with both the master node and the secondary node. Here, the RRC message may be a type obtained by including a predetermined number of bits (for example, 1 bit) in a previously defined message (for example, an RRCconnectionReestablishment request) or a separate message for the request may be defined.

Alternatively, the terminal may generate a message that can be transmitted in the MAC layer or a message that can be transmitted in the PHY layer.

In operation S1330, the terminal may transmit the message to the base station and request release of a connection with the base station.

Figure 14:
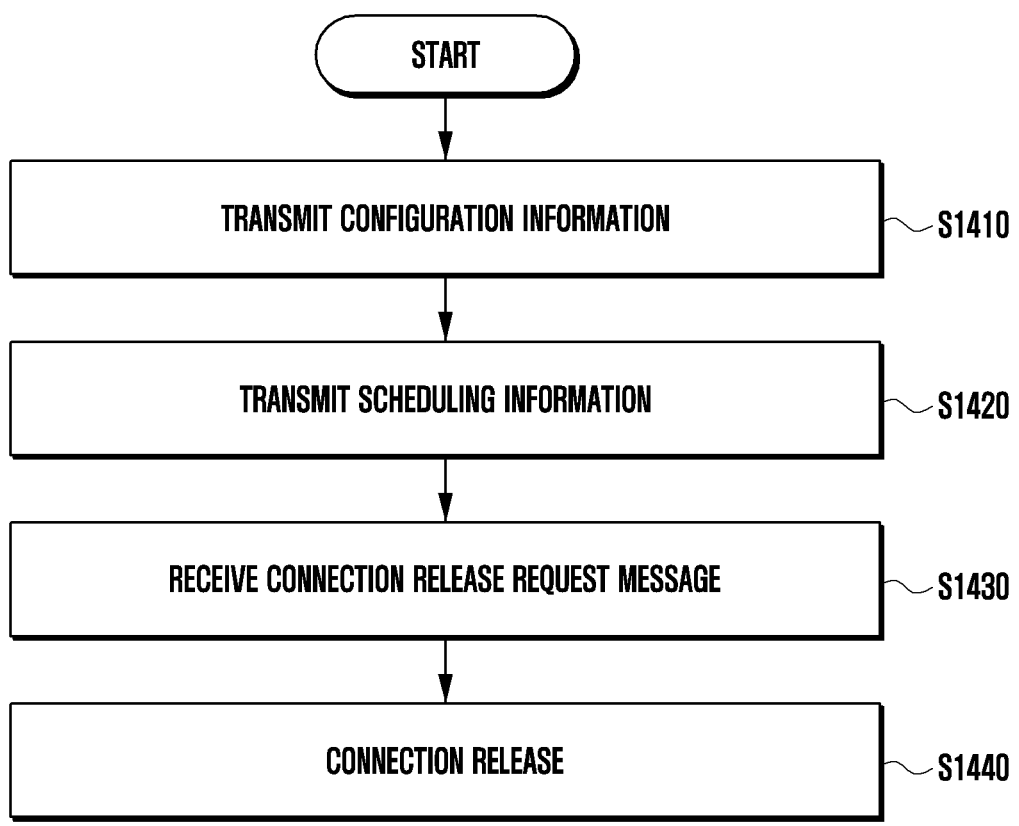
FIG. 14 illustrates an operation sequence of a base station according to an embodiment of the disclosure.

FIG. 14 illustrates an operation sequence of a base station according to an embodiment of the disclosure.

Referring to FIG. 14, the base station may transmit configuration information to a terminal in operation S1410. The configuration information may include the timer information described above, and the configuration information may be transmitted to the terminal through system information or RRC signaling.

In operation S1420, the base station may transmit scheduling information. If there is data to be transmitted to the terminal, the base station may transmit the scheduling information, and may transmit data according to the scheduling information.

In operation S1430, the base station may receive a connection release request message from the terminal. For example, the base station may receive a connection release request message from the terminal based on the time point at which the scheduling information is transmitted and a timer value configured by the base station. Alternatively, the connection release request message may be received according to an application executed in the terminal. The time point at which to receive the connection release request message is the same as that described above, and will be omitted below.

In addition, the base station may receive the connection release request message through at least one of the RRC, MAC, and PHY messages. The details of the connection release request message are the same as described above.

The base station, having received the connection release request message, may release the connection with the terminal in operation S1440. The base station may release a connection between the secondary node and the terminal, or may release the connection both between the master node and the terminal and between the secondary node and the terminal according to the connection release request message of the terminal.

Figure 15:
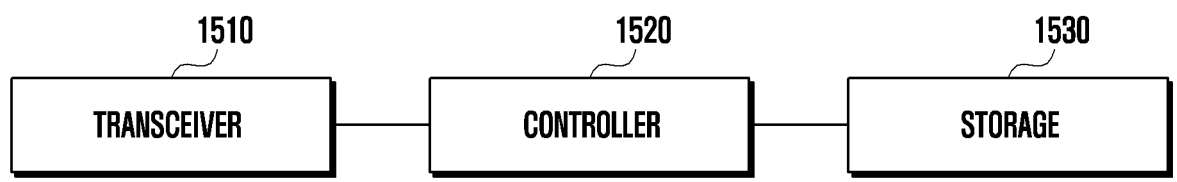
FIG. 15 illustrates the structure of a terminal according to an embodiment of the disclosure.

FIG. 15 illustrates the structure of a terminal according to an embodiment of the disclosure.

Referring to FIG. 15, the terminal may include a transceiver 1510, a controller 1520, and a storage 1530. In the disclosure, the controller may be defined as a circuit, an application-specific integrated circuit, or at least one processor.

The transceiver 1510 may transmit a signal to or from another network entity. The transceiver 1510 may transmit, for example, a connection release request message to the base station.

The controller 1520 may control the overall operation of the terminal according to the embodiment proposed by the disclosure. For example, the controller 1520 may control signal flow between blocks in order to perform operations according to the flowchart described above.

The storage 1530 may store at least one of information transmitted or received through the transceiver 1510 and information generated through the controller 1520.

Figure 16:
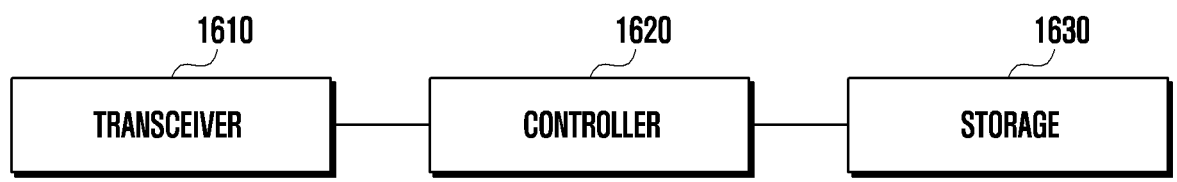
FIG. 16 illustrates the structure of a base station according to an embodiment of the disclosure.

FIG. 16 illustrates the structure of a base station according to an embodiment of the disclosure.

Referring to FIG. 16, the base station may include a transceiver 1610, a controller 1620, and a storage 1630. In the disclosure, the controller may be defined as a circuit, an application-specific integrated circuit, or at least one processor.

The transceiver 1610 may transmit or receive a signal to or from another network entity. The transceiver 1610 may receive, for example, a connection release request message from the terminal.

The controller 1620 may control the overall operation of the base station according to the embodiment proposed by the disclosure. For example, the controller 1620 may control signal flow between blocks in order to perform operations according to the flowchart described above.

The storage 1630 may store at least one of information transmitted or received through the transceiver 1610 and information generated through the controller 1620.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Further, the embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

The invention claimed is:

1. An electronic device comprising:
a transceiver configured to support being connected concurrently with a first cellular communication network through a first cellular communication and a second cellular communication network through a second cellular communication; and
a processor configured to be operatively connected to the transceiver,
wherein the processor is configured to:
identify a first data to be transmitted through the first cellular communication to the first cellular communication network;
reset a timer based on the identification of the first data;
identify a second data being transmitted or received through the second cellular communication to the second cellular communication network;
based on the identified second data, transmit a signal through the first cellular communication to the first cellular communication network before expiration of the timer in a state where data to be transmitted through the first cellular communication does not exist,
wherein the timer is reset based on the transmission of the signal,
wherein a radio resource control (RRC) state of the first cellular communication is maintained in a RRC connected state before the timer expires, and
wherein the RRC state of first cellular communication is set to a RRC idle state based on an expiration of the timer.

2. The electronic device of claim 1, wherein a medium access control (MAC) layer identifies the first data to be transmitted through the first cellular communication to the first cellular communication network.

3. The electronic device of claim 1, wherein the signal is a ping message.

4. The electronic device of claim 1, wherein the signal is a MAC control element (CE) message.

5. The electronic device of claim 1, wherein the signal is a RRC message.

6. The electronic device of claim 1, wherein the processor is further configured to:
determine whether to transmit the signal based on a cell identification of a cell on the first cellular communication, and
in response to a determination to transmit the signal, transmit the signal through the first cellular communication to the first cellular communication network before expiration of the timer in a state where data to be transmitted through the first cellular communication does not exist, based on the identified second data.

7. The electronic device of claim 1, wherein the first cellular communication is a long term evolution (LTE) communication or a new radio (NR) communication, and
wherein the second cellular communication is a NR communication.

8. A method of operating an electronic device connected concurrently with a first cellular communication network through a first cellular communication and a second cellular communication network through a second cellular communication, the method comprising:
identifying a first data to be transmitted through the first cellular communication to the first cellular communication network;
resetting a timer based on the identifying of the first data;
identifying a second data being transmitted or received through the second cellular communication to the second cellular communication network; and
based on the identified second data, transmitting a signal through the first cellular communication to the first cellular communication network before expiration of the timer in a state where data to be transmitted through the first cellular communication does not exist,
wherein the timer is reset based on the transmission of the signal,
wherein a radio resource control (RRC) state of the first cellular communication is maintained in a RRC connected state before the timer expires, and
wherein the RRC state of first cellular communication is set to a RRC idle state based on an expiration of the timer.

9. The method of claim 8, wherein the first data to be transmitted through the first cellular communication to the first cellular communication network is identified in a medium access control (MAC) layer.

10. The method of claim 8, wherein the signal is a ping message.

11. The method of claim 8, wherein the signal is a MAC control element (CE) message.

12. The method of claim 8, wherein the signal is a RRC message.

13. The method of claim 8, wherein the transmitting the signal comprises:
- determining whether to transmit the signal based on a cell identification of a cell on the first cellular communication, and
- in response to determination to transmit the signal, transmitting the signal through the first cellular communication to the first cellular communication network before expiration of the timer in a state where data to be transmitted through the first cellular communication does not exist, based on the identified second data.

14. The method of claim 8, wherein the first cellular communication is a long term evolution (LTE) communication or a new radio (NR) communication, and
- wherein the second cellular communication is a NR communication.

\* \* \* \* \*